US011970609B2

(12) United States Patent
Oozeki et al.

(10) Patent No.: US 11,970,609 B2
(45) Date of Patent: Apr. 30, 2024

(54) RESIN SHEET

(71) Applicant: SEKISUI CHEMICAL CO., LTD., Osaka (JP)

(72) Inventors: Hiroki Oozeki, Kyoto (JP); Hirotaka Takano, Kyoto (JP); Takuto Kosai, Kyoto (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 625 days.

(21) Appl. No.: 17/285,608

(22) PCT Filed: Jul. 25, 2019

(86) PCT No.: PCT/JP2019/029214
§ 371 (c)(1),
(2) Date: Apr. 15, 2021

(87) PCT Pub. No.: WO2020/100350
PCT Pub. Date: May 22, 2020

(65) Prior Publication Data
US 2021/0317303 A1 Oct. 14, 2021

(30) Foreign Application Priority Data

Nov. 12, 2018 (JP) .................. 2018-212188
Dec. 26, 2018 (JP) .................. 2018-243066

(51) Int. Cl.
*C08L 69/00* (2006.01)
(52) U.S. Cl.
CPC ......... *C08L 69/00* (2013.01); *C08L 2205/035* (2013.01)
(58) Field of Classification Search
CPC .................................... C08L 69/00
USPC .................................... 523/201
See application file for complete search history.

(56) References Cited

U.S. PATENT DOCUMENTS

| 2002/0115759 A1 | 8/2002 | Eckel et al. |
| 2007/0072961 A1 | 3/2007 | Ma et al. |
| 2007/0225412 A1 | 9/2007 | Buchholz et al. |
| 2010/0160508 A1 | 6/2010 | Taschner et al. |
| 2018/0244822 A1 | 8/2018 | Kusanose et al. |
| 2020/0291226 A1 | 9/2020 | Soma |

FOREIGN PATENT DOCUMENTS

| JP | 2004-517978 | | 6/2004 |
| JP | 2006-111822 | | 4/2006 |
| JP | 2009-510217 | | 3/2009 |
| JP | 2009-510217 A | * | 3/2009 |
| JP | 2014-240492 | | 12/2014 |
| JP | 2017-19887 | | 1/2017 |
| JP | 6285085 | | 2/2018 |
| WO | 2017/043532 | | 3/2017 |
| WO | 2018/047693 | | 3/2018 |

OTHER PUBLICATIONS

Extended European Search Report dated Jul. 5, 2022 in corresponding European Patent Application No. 19883379.0.
S. Nobuhiro, "Dispersion of Various Substances in Plastics", Journal of the Japan Society of Colour Material, 2005, pp. 233-239, with English translation and cited in CG.
M. Fujiyama, "Mechanism of Mixing Dispersion of Fillers and Points for Their Good Dispersion", Seikei-Kakou, 2011, pp. 83-89, with English translation and cited in CG.
"Jetfine® tales for high performance polypropylene and engineering thermoplastics"; http://www.compoundingworld.com/imerys Publication date: Oct. 2011, cited in CG.
R. K. Bharadwaj, "Modeling the Barrier Properties of Polymer-Layered Silicate Nanocomposites", Macromolecules, 2001, pp. 9189-9192.
A. Sorrentino et al., "Diffusion Behavior in Polymer-Clay Nanocomposites", Journal of Polymer Science: Part B: Polymer Physics, 2005, pp. 265-274.
"High Performance Processing Aid Designed for PVC foam", https://aniq.org.mx/eventos/2016/ForoTecnicoProvinilo/docs/4.%20KANEKA%20FOAM%20Presentation.pdf Publication date: Sep. 8, 2016.
Communication pursuant to Rule 114(2) EPC dated Mar. 28, 2023.
International Search Report (ISR) dated Oct. 15, 2019 in International (PCT) Application No. PCT/JP2019/029214.
Japanese Office Action dated Apr. 9, 2019 in corresponding Japanese Patent Application No. 2018-247369, together with English translation thereof.
Shota Ichikari, 3D Image Analysis of the Spatial Distribution of the Particles Dispersed in Polymers, Department of Macromolecular Science and Technology, Graduate School of Science and Technology, Kyoto Institute of Technology, FY 2013 Master's Theses, Japan, Kyoto Institute of Technology, 2013, p. 26, URL, http://www.cis.kit.ac.jp/~kiro/research/kiro.pho?plugin=attach&refer=%BD%A4%CF%C0%A1%A6%C2%B4%CF%C02012&openfile=%B0%EC%B4%A2%BD%A4%CF%%C0.pdf, with English translation thereof, cited in Japanese OA.

(Continued)

*Primary Examiner* — Deve V Hall
(74) *Attorney, Agent, or Firm* — WENDEROTH, LIND & PONACK, L.L.P.

(57) ABSTRACT

Provided a resin sheet excellent in both flame retardancy and impact resistance. The resin sheet according to the present invention is a resin sheet including an aromatic polycarbonate resin; an inorganic filler; a phosphorus-containing compound; and a silicon-containing compound, the resin sheet having a first surface on one side in a thickness direction; and a section in a direction perpendicular to the first surface, the section having segmentation areas of the inorganic filler, and the resin sheet having a ratio of a standard deviation of the segmentation areas to an average of the segmentation areas, the ratio being 0.53 or less, the segmentation areas each calculated by a segmentation method.

16 Claims, 3 Drawing Sheets

(56) References Cited

OTHER PUBLICATIONS

International Preliminary Report on Patentability and Written Opinion of the International Searching Authority dated May 11, 2021 in International (PCT) Application No. PCT/JP2019/029214.

\* cited by examiner

[FIG. 1]
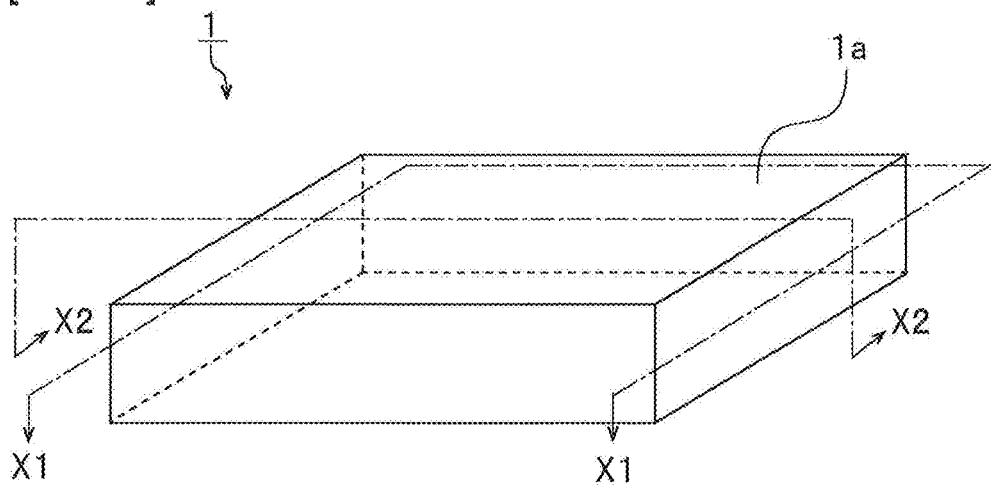
[FIG. 2]
(a)
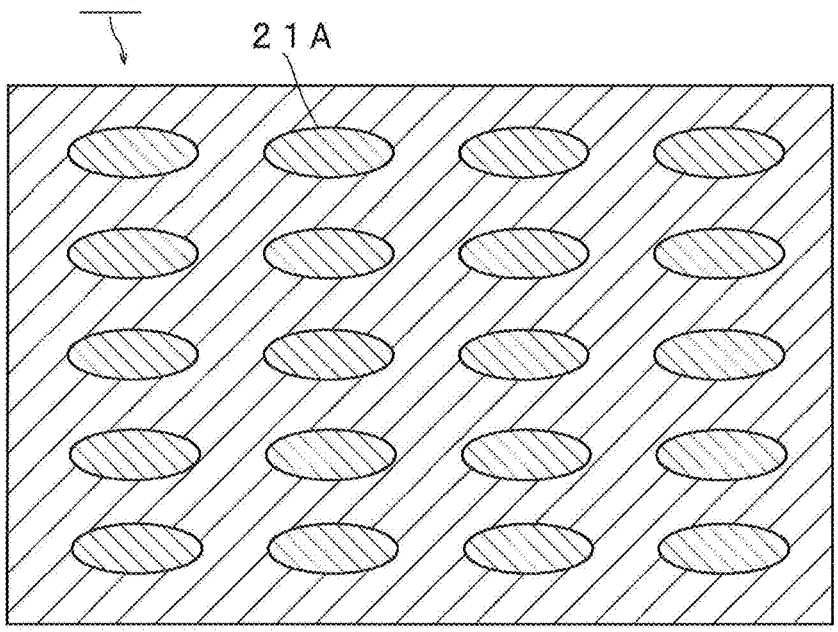
(b)
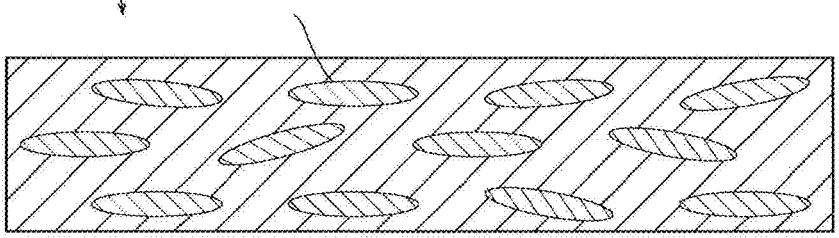

[FIG. 3]
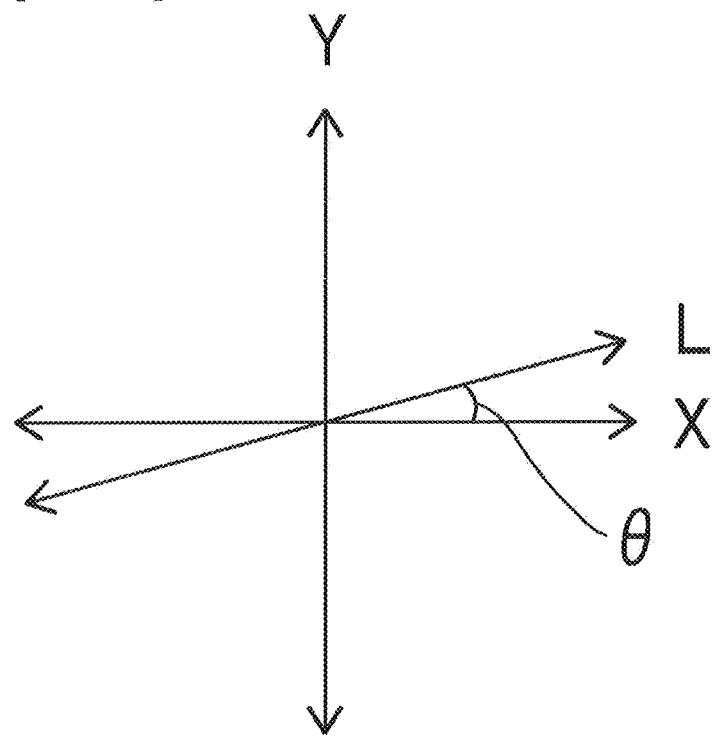
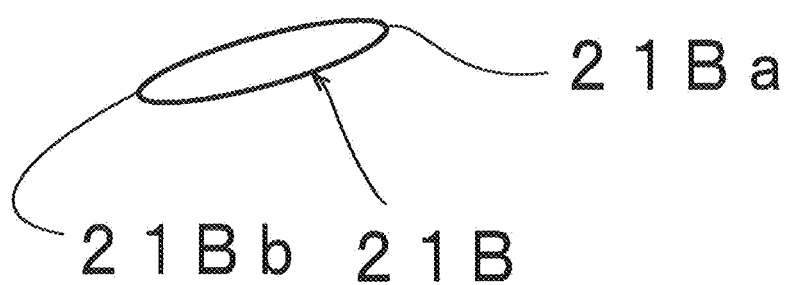

[FIG. 4]
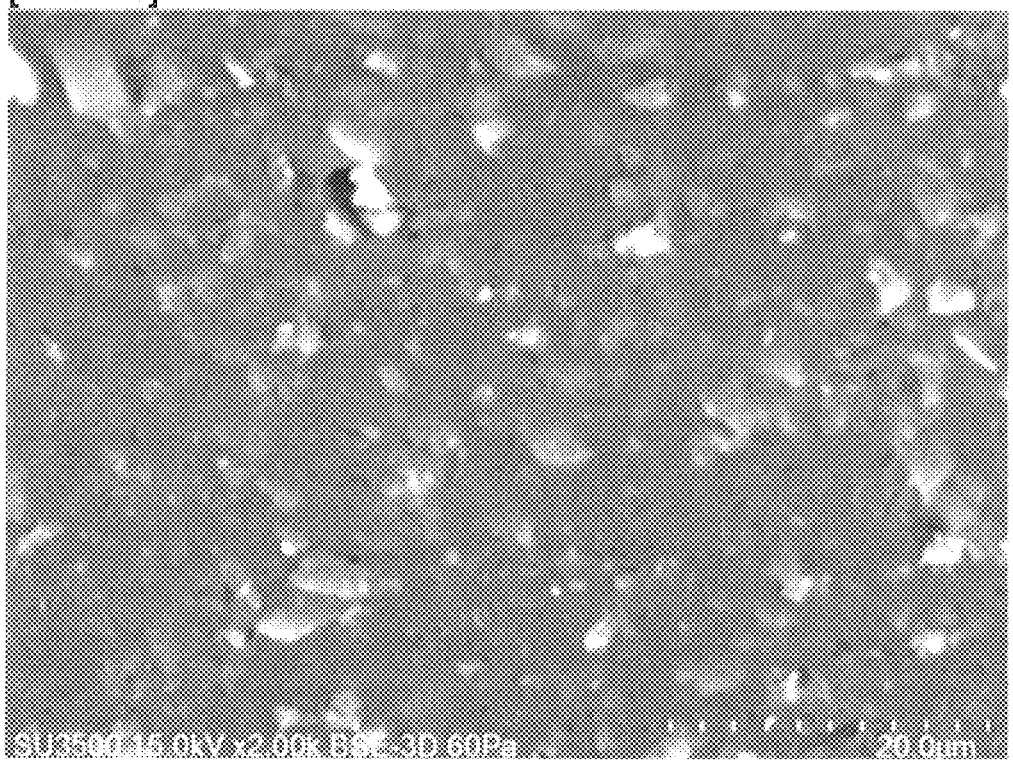
[FIG. 5]
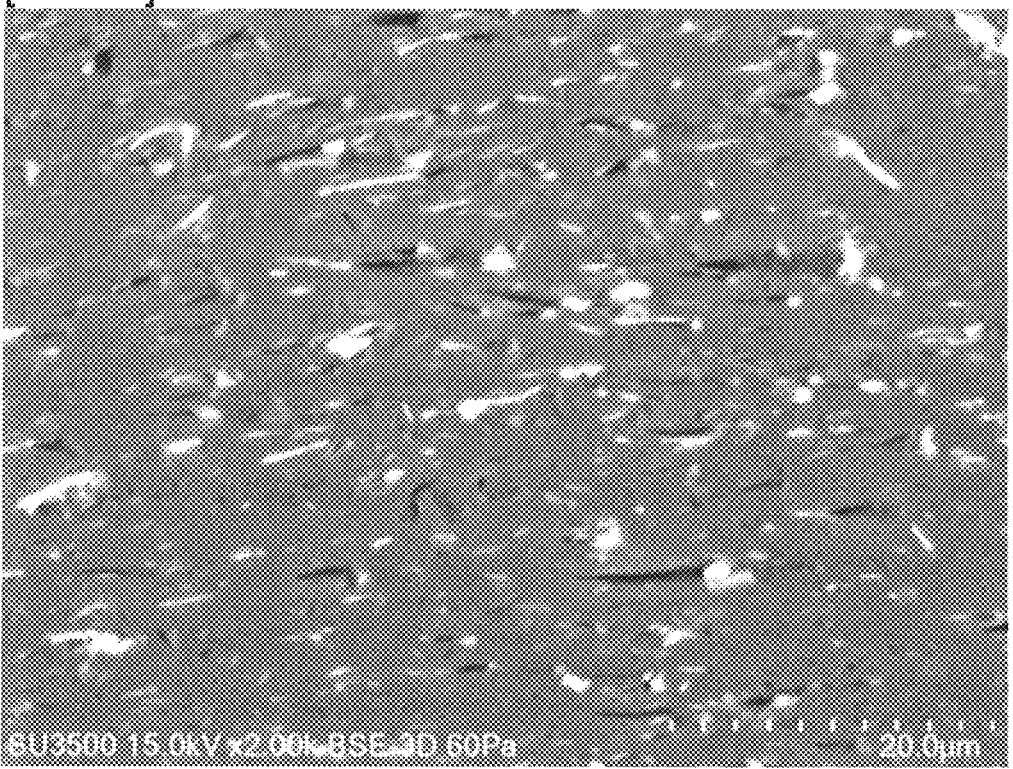

RESIN SHEET

TECHNICAL FIELD

The present invention relates to a resin sheet including an aromatic polycarbonate resin.

BACKGROUND ART

Thermoplastic resins such as polycarbonate resins are excellent in durability, light weight, moldability, and the like. Therefore, thermoplastic resins are used in various fields such as construction, home appliances, and transportation.

Specific examples of the use of the thermoplastic resin include interior materials for transport equipment such as railway vehicles, aircraft, ships, and automobiles.

For the above-described use, the molded body in which the thermoplastic resin is used needs to be excellent in flame retardancy and impact resistance. However, thermoplastic resins are generally flammable and vulnerable to impact, therefore, studies have been widely conducted to improve the flame retardancy and the impact resistance of molded bodies in which a thermoplastic resin is used.

For example, Patent Document 1 below discloses a composition including A) aromatic polycarbonate and/or aromatic polyester carbonate, B) specific silicone/acrylate composite rubber, C) specific talc, and D) specific flameproofing agent. In the composition, the components A) to D) each are included at a specific content. Furthermore, Patent Document 1 describes that a molded body can be produced by injection molding or blow molding of the composition or by thermoforming of the sheet or film preformed from the composition.

Patent Document 2 below discloses a composition including A) aromatic polycarbonate and/or polyester carbonate, B) a reinforcing agent, C) a thermoplastic homopolymer and/or copolymer, and D) a specific phosphorus compound. Furthermore, Patent Document 2 describes that a molded body can be produced by injection molding of the composition.

RELATED ART DOCUMENTS

Patent Documents

Patent Document 1: JP 2014-240492 A
Patent Document 2: JP 2004-517978 T

SUMMARY OF THE INVENTION

Problems to be Solved by the Invention

In a conventional molded body including a resin, the impact resistance is sometimes deteriorated at the time of trying to enhance the flame retardancy. Furthermore, in a conventional molded body including a resin, the flame retardancy is sometimes deteriorated at the time of trying to enhance the impact resistance.

In the molded body obtained from the composition described in Patent Document 1, the flame retardancy and the impact resistance can be enhanced to some extent, but not sufficiently, and further improvement in the flame retardancy and the impact resistance is required. The molded body obtained by injection molding or blow molding of the composition described in Patent Document 1 or by thermoforming of the sheet or film preformed from the composition particularly tends to have a biased distribution of the talc (inorganic filler). As a result, the flame retardancy and the impact resistance are easily deteriorated.

In the molded body obtained from the composition described in Patent Document 2, no inorganic filler is blended, therefore, it is difficult to sufficiently enhance both the flame retardancy and the impact resistance. Even when an inorganic filler is blended in the composition described in Patent Document 2, the molded body obtained by injection molding or the like of the composition tends to have a biased distribution of the inorganic filler. As a result, the flame retardancy and the impact resistance are easily deteriorated.

An object of the present invention is to provide a resin sheet excellent in both flame retardancy and impact resistance.

Means for Solving the Problems

According to a broad aspect of the present invention, provided is a resin sheet including an aromatic polycarbonate resin; an inorganic filler; a phosphorus-containing compound; and a silicon-containing compound, the resin sheet having a first surface on one side in a thickness direction; and a section in a direction perpendicular to the first surface, the section having segmentation areas of the inorganic filler, and the resin sheet having a ratio of a standard deviation of the segmentation areas to an average of the segmentation areas, the ratio being 0.53 or less, the segmentation areas each calculated by a segmentation method.

In a specific aspect of the resin sheet according to the present invention, the inorganic filler has an average orientation angle of 30 degrees or less in a section of the resin sheet, the section in the direction perpendicular to the first surface, the section in which each orientation angle of the inorganic filler is calculated.

In a specific aspect of the resin sheet according to the present invention, a section of the resin sheet, the section in a direction parallel to the first surface has a ratio of an area occupied by the inorganic filler, per unit area, the ratio represented by S1, a section of the resin sheet, the section in the direction perpendicular to the first surface has a ratio of an area occupied by the inorganic filler, per unit area, the ratio represented by S2, and a ratio of S1 to S2 is 2.0 or more.

In a specific aspect of the resin sheet according to the present invention, the inorganic filler has an average particle diameter of 1.5 μm or less in a section of the resin sheet, the section in the direction perpendicular to the first surface, the section in which each particle diameter of the inorganic filler is calculated.

In a specific aspect of the resin sheet according to the present invention, the inorganic filler has an average aspect ratio of 2.2 or more and 5 or less in a section of the resin sheet, the section in the direction perpendicular to the first surface, the section in which each aspect ratio of the inorganic filler is calculated.

In a specific aspect of the resin sheet according to the present invention, an average maximum heat generation rate measured in accordance with ISO5660-1 under a condition of heater radiant heat of 50 kW/$m^2$ using an ignition is 140 kW/$m^2$ or less.

In a specific aspect of the resin sheet according to the present invention, the inorganic filler is talc.

In a specific aspect of the resin sheet according to the present invention, the inorganic filler is included at a content of 10 parts by weight or more and 40 parts by weight or less based on 100 parts by weight of the aromatic polycarbonate resin.

In a specific aspect of the resin sheet according to the present invention, the phosphorus-containing compound is a phosphoric acid ester.

In a specific aspect of the resin sheet according to the present invention, the phosphorus-containing compound is included at a content of 5 parts by weight or more and 25 parts by weight or less based on 100 parts by weight of the aromatic polycarbonate resin.

In a specific aspect of the resin sheet according to the present invention, the silicon-containing compound is a core-shell particle including a core and a shell placed on a surface of the core.

In a specific aspect of the resin sheet according to the present invention, the silicon-containing compound is included at a content of 2 parts by weight or more and 20 parts by weight or less based on 100 parts by weight of the aromatic polycarbonate resin.

In a specific aspect of the resin sheet according to the present invention, a fluorine-based resin is included at a content of 0.5 parts by weight or more and 2 parts by weight or less based on 100 parts by weight of the aromatic polycarbonate resin.

In a specific aspect of the resin sheet according to the present invention, the resin sheet is an extruded sheet molded product.

In a specific aspect of the resin sheet according to the present invention, the resin sheet is an interior material for transport equipment.

In a specific aspect of the resin sheet according to the present invention, the resin sheet is an interior material for a railway vehicle.

Effect of the Invention

The resin sheet according to the present invention includes an aromatic polycarbonate resin, an inorganic filler, a phosphorus-containing compound, and a silicon-containing compound. The resin sheet according to the present invention has a first surface on one side in the thickness direction. The resin sheet according to the present invention has a section, in the direction perpendicular to the first surface, having segmentation areas of the inorganic filler, and the resin sheet has a ratio of a standard deviation of the segmentation areas to an average of the segmentation areas, of 0.53 or less when the segmentation areas are each calculated by a segmentation method. Because the resin sheet according to the present invention has the above-described configuration, the resin sheet is excellent in flame retardancy and impact resistance.

BRIEF DESCRIPTION OF DRAWINGS

FIG. 1 is a perspective view schematically showing a resin sheet according to an embodiment of the present invention.

FIG. 2A is a sectional view schematically showing a section, of a resin sheet, in a direction parallel to the first surface of the resin sheet. FIG. 2B is a sectional view schematically showing a section, of a resin sheet, in the direction perpendicular to the first surface.

FIG. 3 is a view for illustrating an orientation angle θ of an inorganic filler.

FIG. 4 is an electron micrograph of a section, of the resin sheet prepared in Example, in a direction parallel to the first surface.

FIG. 5 is an electron micrograph of a section, of the resin sheet prepared in Example, in the direction perpendicular to the first surface.

MODES FOR CARRYING OUT THE INVENTION

Hereinafter, the present invention will be described in detail.

The resin sheet according to the present invention includes an aromatic polycarbonate resin, an inorganic filler, a phosphorus-containing compound, and a silicon-containing compound. The resin sheet according to the present invention has a first surface on one side in the thickness direction. The resin sheet according to the present invention has a section, in the direction perpendicular to the first surface, having segmentation areas of the inorganic filler, and the resin sheet has a ratio of a standard deviation of the segmentation areas to an average of the segmentation areas, of 0.53 or less when the segmentation areas are each calculated by a segmentation method.

Because the resin sheet according to the present invention has the above-described configuration, the resin sheet is excellent in flame retardancy and impact resistance. In the resin sheet according to the present invention, both the flame retardancy and the impact resistance can be enhanced.

Hereinafter, specific embodiments of the present invention will be described with reference to the drawings.

FIG. 1 is a perspective view schematically showing a resin sheet according to an embodiment of the present invention. In FIG. 1, an inorganic filler and the like are not shown.

A resin sheet 1 shown in FIG. 1 has a first surface 1a on one side in the thickness direction. The resin sheet 1 has a side in the thickness direction and a side in a direction perpendicular to the thickness direction. The direction perpendicular to the thickness direction is, for example, the MD direction or the TD direction. The term "MD direction" refers to the flow direction of a resin sheet at the time of producing the resin sheet, and the term "TD direction" refers to a direction perpendicular to the flow direction of the resin sheet. The resin sheet 1 has a side in the thickness direction, a side in the MD direction, and a side in the TD direction. In the resin sheet 1, the left-right direction is the MD direction. It is preferable that the thickness direction, the MD direction, and the TD direction be perpendicular to each other.

The thickness direction is preferably the direction perpendicular to the first surface. The direction perpendicular to the thickness direction is preferably a direction parallel to the first surface.

The section along the line X1-X1 in FIG. 1 corresponds to a section, of the resin sheet, in a direction parallel to the first surface of the resin sheet. The section along the line X2-X2 in FIG. 1 corresponds to a section, of the resin sheet, in the direction perpendicular to the first surface. The section along the line X2-X2 in FIG. 1 corresponds to a section along the MD direction and the thickness direction.

FIG. 2A is a sectional view schematically showing a section, of a resin sheet, in a direction parallel to the first surface of the resin sheet. FIG. 2B is a sectional view schematically showing a section, of a resin sheet, in the direction perpendicular to the first surface.

FIG. 2A shows a section 11A, of the resin sheet, in the direction parallel to the first surface of the resin sheet. In the section 11A, an inorganic filler 21A is observed.

FIG. 2B shows a section 11B, of the resin sheet, in the direction perpendicular to the first surface of the resin sheet. The section 11B is a section along the MD direction and the thickness direction of the resin sheet. In the section 11B, an inorganic filler 21B is observed.

The resin sheet has a section, in the direction perpendicular to the first surface, having segmentation areas of the inorganic filler, and the resin sheet has a ratio of a standard deviation of the segmentation areas to an average of the segmentation areas (standard deviation of segmentation areas/average of segmentation areas) of 0.53 or less when the segmentation areas are each calculated by a segmentation method. When the above-described ratio (standard deviation of segmentation areas/average of segmentation areas) is more than 0.53, the resin sheet tends to have a biased distribution of the inorganic filler, and as a result, the flame retardancy and the impact resistance are sometimes deteriorated.

The ratio of the standard deviation of the segmentation areas to the average of the segmentation areas (standard deviation of segmentation areas/average of segmentation areas) is preferably 0.52 or less, more preferably 0.51 or less, and still more preferably 0.50 or less. When the above-described ratio (standard deviation of segmentation areas/average of segmentation areas) is the above-described upper limit or less, the dispersion state of the inorganic filler in the resin sheet can be good, and the flame retardancy and the impact resistance can be further enhanced. The smaller, the more preferable the above-described ratio (standard deviation of segmentation areas/average of segmentation areas) is.

A section, of the resin sheet, in a direction parallel to the first surface has a ratio of the area occupied by the inorganic filler, per unit area, and the ratio is represented by S1(%). A section, of the resin sheet, in the direction perpendicular to the first surface has a ratio of the area occupied by the inorganic filler, per unit area, and the ratio is represented by S2(%). The ratio of S1 to S2 (S1/S2) is preferably 2.0 or more, more preferably 2.1 or more, and still more preferably 2.2 or more. When the above-described ratio (S1/S2) is the above-described lower limit or more, the flame retardancy can be further enhanced. More specifically, when the ratio (S1/S2) is the lower limit or more, the inorganic filler in the resin sheet can be in a state of being oriented in a direction parallel to the first surface. Therefore, even when the resin sheet burns, it is possible to effectively suppress the emission of inflammable gas generated by the resin decomposition at the time of the burning of the resin sheet, and the carbide (char) of the resin sheet can effectively prevent the gap. As a result, the flame retardancy can be enhanced. The larger, the more preferable the ratio (S1/S2) is.

The section, of the resin sheet, in a direction parallel to the first surface is preferably a section at the center in the thickness direction of the resin sheet. The section, of the resin sheet, in a direction parallel to the first surface is preferably a section passed through the center of the resin sheet.

FIG. 3 is a view for illustrating an orientation angle θ of an inorganic filler. FIG. 3 shows an inorganic filler 21B observed in a section, of the resin sheet, in the direction perpendicular to the first surface. The inorganic filler 21B has one end 21Ba and the other end 21Bb in a section, of the resin sheet, in the direction perpendicular to the first surface, and the distance between the one end 21Ba and the other end 21Bb is a long diameter of the inorganic filler 21 in the section, of the resin sheet, in the direction perpendicular to the first surface. In FIG. 3, X is an axis perpendicular to the thickness direction of the resin sheet in a section in the direction perpendicular to the first surface, Y is an axis in the thickness direction of the resin sheet in the section in the direction perpendicular to the first surface, and L is an axis in the direction of the long diameter of the inorganic filler in the section, of the resin sheet, in the direction perpendicular to the first surface, and is in the orientation direction. The angle formed by the axis X perpendicular to the thickness direction of the resin sheet and the axis L in the orientation direction of the inorganic filler is regarded as the orientation angle θ of the inorganic filler 21. The axis X perpendicular to the thickness direction of the resin sheet is preferably in the MD direction. The term "orientation angle θ" means the smaller angle formed by the direction perpendicular to the thickness direction of the resin sheet (preferably the MD direction) and the orientation direction of the inorganic filler. Therefore, the maximum of the orientation angle θ is 90 degrees.

The inorganic filler preferably has an average orientation angle θ of 10 degrees or more, more preferably 12 degrees or more, and still more preferably 14 degrees or more in a section, of the resin sheet, in the direction perpendicular to the first surface when each orientation angle θ of the inorganic filler is calculated in the section. The inorganic filler preferably has an average orientation angle θ of 32 degrees or less, more preferably 30 degrees or less, still more preferably 28 degrees or less, still even more preferably 25 degrees or less, and particularly preferably 22 degrees or less in a section, of the resin sheet, in the direction perpendicular to the first surface when each orientation angle θ of the inorganic filler is calculated in the section. With the inorganic filler having an average orientation angle θ of the above-described lower limit or more and the above-described upper limit or less, even when the resin sheet burns, the gas barrier effect effectively works against the generation of inflammable gas to suppress the burning rate effectively, and as a result, the flame retardancy can be further enhanced. Furthermore, when the inorganic filler has an average orientation angle θ of the lower limit or more, the variation in the mechanical strength of the resin sheet can be effectively suppressed.

The inorganic filler preferably has an average particle diameter D of 0.6 μm or more, more preferably 0.7 μm or more, and preferably 1.5 μm or less, more preferably 1.4 μm or less in a section, of the resin sheet, in the direction perpendicular to the first surface when each particle diameter of the inorganic filler is calculated in the section. When the inorganic filler has an average particle diameter D of the above-described lower limit or more and the above-described upper limit or less, the flame retardancy and the impact resistance can be further enhanced.

When the resin sheet has an axis in the MD direction and an axis in the TD direction, the resin sheet has a section along the MD direction and a section along the TD direction in a direction parallel to the first surface, and the inorganic filler preferably has an average particle diameter D that satisfies the above-described lower limit and the above-described upper limit in the section along the MD direction.

The inorganic filler preferably has an average aspect ratio A of 2 or more, more preferably 2.2 or more, still more preferably 2.4 or more, and preferably 5 or less, more preferably 4.5 or less in a section, of the resin sheet, in the direction perpendicular to the first surface when each aspect ratio of the inorganic filler is calculated in the section. When the inorganic filler has an average aspect ratio A of the above-described lower limit or more and the above-described upper limit or less, the flame retardancy and the impact resistance can be further enhanced.

When the resin sheet has an axis in the MD direction and an axis in the TD direction, the resin sheet has a section along the MD direction and a section along the TD direction in a direction parallel to the first surface, and the inorganic filler preferably has an average aspect ratio A that satisfies the above-described lower limit and the above-described upper limit in the section along the MD direction.

The section, of the resin sheet, in the direction perpendicular to the first surface is preferably a section passed through the center of the resin sheet.

The ratio (standard deviation of segmentation areas/average of segmentation areas), S1, S2, the ratio (S1/S2), the average orientation angle θ of the inorganic filler, the average particle diameter D of the inorganic filler, and the average aspect ratio A of the inorganic filler that are described above are specifically measured as follows.

(1) Photographing with Electron Microscope:

A resin sheet is subjected to machining to prepare a measurement sample A in which a section A, of the resin sheet, in a direction parallel to the first surface is exposed. Furthermore, the resin sheet is subjected to machining to prepare a measurement sample B in which a section B, of the resin sheet, in the direction perpendicular to the first surface is exposed. The resin sheet may be cut without machining so that the section is exposed. In the measurement samples A and B, the exposed sections A and B may be surface-polished. The section B, of the resin sheet, in the direction perpendicular to the first surface may be a section along the MD direction or a section along the TD direction. The section B, of the resin sheet, in the direction perpendicular to the first surface is preferably a section along the MD direction.

The sections A and B are photographed using an electron microscope (preferably a scanning electron microscope). The following calculations (2) to (6) are performed for the inorganic filler in which the observed inorganic filler has a sectional area (projected area) of more than 0.1 μm² in the photographing with an electron microscope.

(2) Calculation of Ratio (Standard Deviation of Segmentation Areas/Average of Segmentation Areas):

From the electron micrograph of the section B, each segmentation area of the inorganic filler is calculated by a segmentation method using commercially available image analysis software. The ratio of the standard deviation of the obtained segmentation areas to the average of the segmentation areas (standard deviation of segmentation areas/average of segmentation areas) is calculated. The segmentation areas of 100 or more of the arbitrarily selected inorganic fillers are each determined.

More specifically, the Voronoi division is performed using each centroid of the inorganic filler as a generating point, and the area of each Voronoi region of the inorganic filler is calculated. The ratio of the standard deviation of the obtained areas of the Voronoi regions to the average of the areas of the Voronoi regions (standard deviation of areas of Voronoi regions/average of areas of Voronoi regions) is calculated. The areas of the Voronoi regions of 100 or more of the arbitrarily selected inorganic fillers are each determined.

When 100 or more of the inorganic fillers are not present in the obtained electron micrograph, an additional region is photographed with an electron microscope until the number of the inorganic fillers is 100 or more.

(3) Calculation of S1, S2, and Ratio (S1/S2):

From the electron micrograph of the section A, the ratio of the area occupied by the inorganic filler in the section A per unit area (%) is calculated using commercially available image analysis software. The ratio of the area occupied is represented by S1(%). S1 described above is the area ratio of the region where the inorganic filler is present to 100% of the area (sectional area) of the section A. S1 is calculated from 100 or more of the inorganic fillers. S1 can be calculated by, for example, the following formula.

$$S1(\%) = \text{total of projected areas of inorganic filler} / \text{area of observation visual field of section } A \text{ described above} \times 100$$

From the electron micrograph of the section B, the ratio of the area occupied by the inorganic filler in the section B per unit area (%) is calculated using commercially available image analysis software. The ratio of the area occupied is represented by S2(%). S2 described above is the area ratio of the region where the inorganic filler is present to 100% of the area (sectional area) of the section B. S2 is calculated from 100 or more of the inorganic fillers. S2 can be calculated by, for example, the following formula.

$$S2(\%) = \text{total of projected areas of inorganic filler} / \text{area of observation visual field of section } B \text{ described above} \times 100$$

In the calculation of S1 and S2, when 100 or more of the inorganic fillers are not present in the obtained electron micrograph, an additional region is photographed with an electron microscope until the number of the inorganic fillers is 100 or more.

From the resulting S1 and S2, the ratio of S1 to S2 (S1/S2) is calculated.

(4) Calculation of Average Orientation Angle θ of Inorganic Filler:

From the electron micrograph of the section B, each orientation angle θ of the inorganic filler is calculated using commercially available image analysis software. The average of the orientation angles θ of 100 or more of the arbitrarily selected inorganic fillers is determined. The orientation angle θ of the inorganic filler is preferably measured in the section B including the center in the thickness direction of the resin sheet.

In the calculation of the average orientation angle θ of the inorganic filler, when 100 or more of the inorganic fillers are not present in the obtained electron micrograph, an additional region is photographed with an electron microscope until the number of the inorganic fillers is 100 or more.

(5) Calculation of Average Particle Diameter D of Inorganic Filler:

The average particle diameter D of the inorganic filler means the average equivalent circle diameter. The term "equivalent circle diameter" means the diameter of a circle having the same area as the projected area of the inorganic filler.

From the electron micrograph of the section B, each particle diameter (equivalent circle diameter) of the inorganic filler is calculated using commercially available image analysis software. The average of the equivalent circle diameters of 100 or more of the arbitrarily selected inorganic fillers is determined and regarded as the average particle diameter D.

In the calculation of the average particle diameter D, when 100 or more of the inorganic fillers are not present in the obtained electron micrograph, an additional region is photographed with an electron microscope until the number of the inorganic fillers is 100 or more.

(6) Calculation of Average Aspect Ratio A of Inorganic Filler:

From the electron micrograph of the section B, the aspect ratio (long diameter/short diameter) of the inorganic filler is calculated using commercially available image analysis software. The average of the aspect ratios of 100 or more of the arbitrarily selected inorganic fillers is determined and regarded as the average aspect ratio A.

In the calculation of the average aspect ratio A, when 100 or more of the inorganic fillers are not present in the obtained electron micrograph, an additional region is photographed with an electron microscope until the number of the inorganic fillers is 100 or more.

In the resin sheet, the average maximum heat generation rate measured in accordance with ISO5660-1 under a condition of heater radiant heat of 50 kW/m² using an ignition is preferably 140 kW/m² or less, more preferably 135 kW/m² or less, and still more preferably 130 kW/m² or less. When the average maximum heat generation rate is the above-described upper limit or less, the flame retardancy can be further enhanced. In order to further enhance the flame retardancy, the lower, the more preferable the average maximum heat generation rate is.

The average maximum heat generation rate is specifically measured as follows.

The resin sheet is subjected to machining or the like to obtain a sample for measuring the heat generation rate having a length of 100 mm×a width of 100 mm×a thickness of 3 mm. The obtained sample for measuring the heat generation rate is measured in accordance with ISO5660-1 with a cone calorimeter test device under a condition of heater radiant heat of 50 kW/m² using an ignition to determine the heat generation rate. When the thickness of the resin sheet is less than 3 mm, a sample for measuring the heat generation having a thickness of 3 mm may be prepared using the material of the resin sheet.

The average maximum heat generation rate is a value calculated in accordance with EN45545-2 using the heat generation rate measured in accordance with ISO5660-1.

From the heat generation rate (q) measured in accordance with ISO5660-1 and the measurement time (T) of the heat generation rate, the average heat generation rate is calculated by the following formula.

$$\text{Average heat generation rate} = \frac{\sum_{2}^{n}\{(T_n - T_{n-1}) \times (q_n + q_{n-1})/2\}}{T_n - T_1} \quad [\text{Mathematical 1}]$$

n means the number of measurement plots with an interval of 2 seconds. n is preferably an integer of 3 or more.

The average heat generation rate is calculated for each of the plurality of samples for measuring the heat generation rate, and the maximum of the obtained average heat generation rates is regarded as the average maximum heat generation rate. The average maximum heat generation rate is preferably a value calculated using three or more samples for measuring the heat generation rate.

In the resin sheet, the Izod impact strength measured in accordance with JIS K7110: 1999 is preferably 20 kJ/m² or more, more preferably 22 kJ/m² or more, and still more preferably 24 kJ/m² or more. When the Izod impact strength is the above-described lower limit or more, the Impact resistance can be further enhanced. In order to further enhance the impact resistance, the larger, the more preferable the Izod impact strength is.

The resin sheet preferably has a thickness of 1 mm or more, more preferably 2 mm or more, and preferably 7 mm or less, more preferably 6 mm or less. When the resin sheet has a thickness of the above-described lower limit or more, the flame retardancy can be further improved. When the resin sheet has a thickness of the above-described upper limit or less, the impact resistance can be further improved.

In the resin sheet according to the present invention, the first surface or a second surface opposite from the first surface may be laminated with another layer such as a thermoplastic resin layer, a fiber-reinforced resin layer, a gas barrier layer, a metal layer, or an adhesive layer.

The resin sheet according to the present invention can be produced by molding a resin composition into a sheet shape. The resin composition contains an aromatic polycarbonate resin, an inorganic filler, a phosphorus-containing compound, and a silicon-containing compound.

Hereinafter, the components included in the resin sheet according to the present invention, the components contained in the resin composition, and the like will be described in detail.

[Aromatic Polycarbonate Resin]

The resin sheet according to the present invention includes an aromatic polycarbonate resin. The resin composition contains an aromatic polycarbonate resin. As the aromatic polycarbonate resin, aromatic polycarbonate resins may be used singly, or in combination of two or more kinds thereof.

The aromatic polycarbonate resin preferably has a structural unit represented by Formula (1) described below.

[Chemical 1]

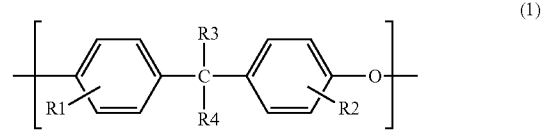

In Formula (1), R1 and R2 each represent a hydrogen atom, an alkyl group having 1 to 20 carbon atoms, an alkyl group having 1 to 20 carbon atoms with a substituent, or an aryl group. In Formula (1), R3 and R4 each represent a hydrogen atom or an alkyl group.

When R3 or R4 in Formula (1) is an alkyl group, the number of carbon atoms in the alkyl group is preferably 1 or more, and preferably 6 or less, more preferably 3 or less, and still more preferably 2 or less. Preferable examples of the alkyl group include a methyl group, an ethyl group, a propyl group, a butyl group, a tert-butyl group, a pentyl group, and a heptyl group.

Examples of the compound used for introducing the structural unit represented by Formula (1) at the time of producing the aromatic polycarbonate resin include 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)pentane, 2,2-bis(4-hydroxyphenyl)-4-methylpentane, 2,2-bis(4-hydroxy-3-methylphenyl) propane (bisphenol C), 2,2-bis(4-hydroxy-3-(1-methylethyl)phenyl)propane, 2,2-bis(4-hydroxy-3-tert-butylphenyl)propane, 2,2-bis(4-hydroxy-3-(1-methylpropyl)phenyl)propane, 2,2-bis(4-hydroxy-3-cyclohexylphenyl)propane, 2,2-bis(4-hydroxy-3- phenylphenyl)propane, 1,1-bis(4-hydroxyphenyl) decane, 1,1-bis(4-hydroxyphenyl)cyclohexane (bisphenol Z), 1,1-bis(4-hydroxyphenyl)-1-phenylethane, bis(4-hydroxyphenyl)phenylmethane, 1,1-bis(4-hydroxy-3-methylphenyl)cyclohexane, 1,1-bis(4-hydroxy-3,5-dimethylphenyl) cyclohexane, 1,1-bis(4-hydroxy-3-(1-methylethyl)phenyl) cyclohexane, 1,1-bis(4-hydroxy-3-tert-butylphenyl) cyclohexane, 1,1-bis(4-hydroxy-3-(1-methylpropyl)phenyl) cyclohexane, 1,1-bis(4-hydroxy-3-cyclohexylphenyl) cyclohexane, 1,1-bis(4-hydroxy-3-phenylphenyl) cyclohexane, 1,1-bis(4-hydroxy-3-methylphenyl)-1-phenylethane, 1,1-bis(4-hydroxy-3,5-dimethylphenyl)-1-phenylethane, 1,1-bis(4-hydroxy-3-(1-methylethyl)phenyl)-1-phenylethane, 1,1-bis(4-hydroxy-3-tert-butylphenyl)-1-phenylethane, 1,1-bis(4-hydroxy-3-(1-methylpropyl) phenyl)-1-phenylethane, 1,1-bis(4-hydroxy-3-cyclohexylphenyl)-1-phenylethane, 1,1-bis(4-hydroxy-3-phenylphenyl)-1-phenylethane, 1,1-bis(4-hydroxyphenyl) cyclopentane, 1,1-bis(4-hydroxyphenyl)cyclooctane, 4,4'-(1,3-phenylenediisopropyridene)bisphenol, 4,4'-(1,4-phenylenediisopropyridene)bisphenol, 9,9-bis(4-hydroxyphenyl)fluorene, 9,9-bis(4-hydroxy-3-methylphenyl)fluorene, 4,4'-dihydroxybenzophenone, 4,4'-dihydroxyphenyl ether, 4,4'-dihydroxybiphenyl, 1,1-bis(4-hydroxyphenyl)-3,3-5-trimethylcyclohexane, and 1,1-bis(4-hydroxy-6-methyl-3-tert-butylphenyl)butane.

From the viewpoint of further enhancing the flame retardancy and the impact resistance, the compound used for introducing the structural unit represented by Formula (1) at the time of producing the aromatic polycarbonate resin is preferably 2,2-bis(4-hydroxyphenyl)propane (bisphenol A), 2,2-bis(4-hydroxy-3-methylphenyl)propane (bisphenol C), or 1,1-bis(4-hydroxyphenyl)cyclohexane (bisphenol Z), and more preferably 2,2-bis(4-hydroxyphenyl)propane (bisphenol A). The aromatic polycarbonate resin preferably has a structural unit derived from such a preferable compound.

Examples of the commercially available aromatic polycarbonate resin having a structural unit derived from a bisphenol A type compound include "Iupilon E" manufactured by MITSUBISHI GAS CHEMICAL COMPANY, INC.

Examples of the commercially available aromatic polycarbonate resin having a structural unit derived from a bisphenol Z type compound include "Panlite" manufactured by Teijin Chemicals Limited and "Iupilon Z" manufactured by MITSUBISHI GAS CHEMICAL COMPANY, INC.

The aromatic polycarbonate resin preferably has a viscosity average molecular weight (Mv) of 10,000 or more, more preferably 15,000 or more, and preferably 50,000 or less, more preferably 40,000 or less. When the aromatic polycarbonate resin has a viscosity average molecular weight of the above-described lower limit or more and the above-described upper limit or less, the flame retardancy and the impact resistance can be further enhanced.

The aromatic polycarbonate resin may have a branched structure, or may have no branched structure.

The aromatic polycarbonate resin can be prepared by a conventionally known method. Examples of the method for preparing the aromatic polycarbonate resin include a melt polymerization method and a phase interface method.

Examples of the method for preparing the aromatic polycarbonate resin by a melt polymerization method include a method in which a diphenol compound and a diphenyl carbonate compound are reacted in a molten state by utilizing a transesterification. In this method, for example, a diphenol compound and a diphenyl carbonate compound are put in a reactor equipped with a stirrer and a distillation concentrator, and the reactor is heated to a predetermined temperature in a nitrogen gas atmosphere to achieve a molten state. In the method for preparing the aromatic polycarbonate resin by a melt polymerization method, a branching agent, a chain terminator, or the like may be used.

Examples of the method for preparing the aromatic polycarbonate resin by a phase interface method include a method in which a diphenol compound, a carbonate halide or an aromatic dicarboxylic acid dihalide, a branching agent if necessary, and a chain terminator if necessary are reacted. In this method, a carbonate halide may be used, an aromatic dicarboxylic acid dihalide may be used, or a carbonate halide and an aromatic dicarboxylic acid dihalide may be used.

The diphenol compound is not particularly limited. As the diphenol compound, a conventionally known diphenol compound can be used. As the diphenol compound, diphenol compounds may be used singly, or in combination of two or more kinds thereof.

The diphenyl carbonate compound is not particularly limited. As the diphenyl carbonate compound, a conventionally known diphenyl carbonate compound can be used. As the diphenyl carbonate compound, diphenyl carbonate compounds may be used singly, or in combination of two or more kinds thereof.

The carbonate halide is not particularly limited. As the carbonate halide, a conventionally known carbonate halide can be used. As the carbonate halide, carbonate halides may be used singly, or in combination of two or more kinds thereof.

The carbonate halide is preferably phosgene.

The aromatic dicarboxylic acid dihalide is not particularly limited. As the aromatic dicarboxylic acid dihalide, a conventionally known aromatic dicarboxylic acid dihalide can be used. As the aromatic dicarboxylic acid dihalide, aromatic dicarboxylic acid dihalides may be used singly, or in combination of two or more kinds thereof.

The aromatic dicarboxylic acid dihalide is preferably a benzenedicarboxylic acid dihalide.

The branching agent is not particularly limited. As the branching agent, a conventionally known branching agent can be used. As the branching agent, branching agents may be used singly, or in combination of two or more kinds thereof.

The branching agent is preferably a trifunctional phenol compound or a tetrafunctional phenol compound, more preferably a triphenol compound, a tetraphenol compound, or a phenol compound having at least three functional groups having low reactivity, and still more preferably 1,1,1-tris-(p-hydroxyphenyl)ethane. By using such a preferable branching agent, the aromatic polycarbonate resin having a branched structure can be satisfactorily obtained.

The branching agent may be a phenol compound having an amine functional group. When the branching agent is a phenol compound having an amine functional group, the amine functional group acts as an active functional group to generate a branch through an amide bond in the aromatic polycarbonate resin.

The chain terminator is not particularly limited. As the chain terminator, a conventionally known chain terminator can be used. As the chain terminator, chain terminators may be used singly, or in combination of two or more kinds thereof.

From the viewpoint of obtaining the aromatic polycarbonate resin satisfactorily, the chain terminator is preferably phenol; p-chlorophenol; p-tert-butylphenol; 2,4,6-tribromophenol; a long-chain alkylphenol such as 4-(1,3-tetramethylbutyl)-phenol described in DE-A 2 842 005 or a monoalkylphenol having 8 to 20 carbon atoms in the alkyl substituent; or an alkylphenol such as 3,5-di-tert-butylphenol, p-isooctylphenol, p-tert-octylphenol, p-dodecylphenol, 2-(3,5-dimethylheptyl)-phenol, or 4-(3,5-dimethylheptyl)-phenol.

From the viewpoint of obtaining the aromatic polycarbonate resin satisfactorily, the content of the chain terminator is preferably 0.5 mol or more and preferably 10 mol or less based on 100 mol of the diphenol compound.

The content of the aromatic polycarbonate resin is preferably 50% by weight or more, more preferably 55% by weight or more, and preferably 85% by weight or less, more preferably 80% by weight or less based on 1.00% by weight of the resin sheet. When the content of the aromatic polycarbonate resin is the above-described lower limit or more and the above-described upper limit or less, the flame retardancy and the impact resistance can be further enhanced.

[Inorganic Filler]

The resin sheet according to the present invention includes an inorganic filler. The resin composition contains an inorganic filler. Because the resin sheet includes the inorganic filler, the flame retardancy and the impact resistance can be enhanced. When the resin sheet does not include the inorganic filler, it is difficult to enhance both the flame retardancy and the impact resistance. As the inorganic filler, inorganic fillers may be used singly, or in combination of two or more kinds thereof.

Examples of the inorganic filler include talc, mica, montmorillonite, silica, diatomaceous earth, alumina, titanium oxide, calcium oxide, magnesium oxide, iron oxide, tin oxide, antimony oxide, ferrites, calcium hydroxide, magnesium hydroxide, aluminum hydroxide, basic magnesium carbonate, calcium carbonate, magnesium carbonate, zinc carbonate, barium carbonate, dawsonite, hydrotalcite, calcium sulfate, barium sulfate, gypsum fibers, potassium salts such as calcium silicate, viscous minerals, glass fibers, glass beads, silica-based balloons, aluminum nitride, boron nitride, silicon nitride, carbon black, graphite, carbon fibers, carbon balloons, charcoal powders, metal powders, potassium titanate, magnesium sulfate, lead zirconate titanate, aluminum borate, molybdenum sulfide, carbonized silicon, stainless fibers, zinc borate, magnetic powders, slag fibers, fly ash, silica-alumina fibers, alumina fibers, silica fibers, and zirconia fibers.

From the viewpoint of further enhancing the flame retardancy and the impact resistance, the inorganic filler is preferably talc, mica, or montmorillonite, and more preferably talc.

The talc may be compressed talc. When the talc is compressed talc, the resin composition can be easily processed.

The inorganic filler may be subjected to surface treatment such as silane treatment, plasma treatment, or ashing treatment. When subjected to surface treatment such as silane treatment, the inorganic filler is further compatible with the aromatic polycarbonate resin.

The inorganic filler preferably has a particle diameter and a shape with which the average particle diameter D and the average aspect ratio A that are calculated at the time of observing a certain section of the resin sheet can be set in the above-described preferable ranges.

From the viewpoints of setting the average particle diameter D in the preferable range and further improving the flame retardancy and the impact resistance, the inorganic filler preferably has a volume average particle diameter (D50) of 1 μm or more, more preferably 1.5 μm or more, and preferably 6 μm or less, more preferably 5 μm or less.

The volume average particle diameter of the inorganic filler is an average diameter measured on a volume basis, and is a value of a median diameter (D50) that is a 50% particle diameter. The volume average particle diameter (050) can be measured by a laser diffraction/scattering method, an image analysis method, a Coulter method, a centrifugal sedimentation method, or the like. The volume average particle diameter (D50) of the inorganic filler is preferably determined by measurement by a laser diffraction/scattering method.

From the viewpoints of setting the average aspect ratio A in the preferable range and further improving the flame retardancy and the impact resistance, the inorganic filler preferably has an average aspect ratio of 2.2 or more, more preferably 2.4 or more, and preferably 5 or less, more preferably 4.5 or less.

The aspect ratio is the ratio of the volume average particle diameter of the inorganic filler to the average thickness of the inorganic filler (volume average particle diameter of inorganic filler/thickness of inorganic filler). The aspect ratio can be measured by a water surface particle film method or the like. The average aspect ratio is the average of the aspect ratios of the plurality of inorganic fillers.

The content of the inorganic filler is preferably 8% by weight or more, more preferably 12% by weight or more, and preferably 25% by weight or less, more preferably 20% by weight or less based on 100% by weight of the resin sheet. When the content of the inorganic filler is the above-described lower limit or more, the flame retardancy can be further enhanced. When the content of the inorganic filler is the above-described upper limit or less, the impact resistance can be further enhanced.

The content of the inorganic filler is preferably 10 parts by weight or more, more preferably 15 parts by weight or more, and preferably 40 parts by weight or less, more preferably 30 parts by weight or less based on 100 parts by weight of the aromatic polycarbonate resin. When the content of the inorganic filler is the above-described lower limit or more, the flame retardancy can be further enhanced. When the content of the inorganic filler is the above-described upper limit or less, the impact resistance can be further enhanced.

[Phosphorus-Containing Compound]

The resin sheet according to the present invention includes a phosphorus-containing compound. The resin composition contains a phosphorus-containing compound. The phosphorus-containing compound is preferably a phosphorus-based flame retardant. Because the resin sheet includes the phosphorus-containing compound, the flame retardancy can be enhanced. When the resin sheet does not include the phosphorus-containing compound, the flame retardancy is sometimes inferior. As the phosphorus-containing compound, phosphorus-containing compounds may be used singly, or in combination of two or more kinds thereof.

The phosphorus-containing compound may have a halogen atom, may have no halogen atom, or may be a mixture of a phosphorus-containing compound having no halogen atom and a phosphorus-containing compound having a halogen atom.

The phosphorus-containing compound needs to be a compound containing a phosphorus atom, and may be a compound derived from resorcinol, hydroquinone, bisphenol A, diphenylphenol, or the like.

Examples of the phosphorus-containing compound include phosphoric acid monomers, phosphoric acid oligomers, phosphonic acid esters, organophosphites, phosphonates, phosphonate amines, phosphates, phosphazenes, and phosphoric acid esters.

From the viewpoint of further enhancing the flame retardancy, the phosphorus-containing compound is preferably a phosphoric acid ester. The phosphoric acid ester is a compound having a phosphoric acid ester structure.

The phosphoric acid ester may be a phosphoric acid monoester, a phosphoric acid diester, or a phosphoric acid triester.

Examples of the phosphoric acid ester include tributyl phosphate, triphenyl phosphate, tricresyl phosphate, diphenyl cresyl phosphate, diphenyl octyl phosphate, diphenyl-2-ethyl cresyl phosphate, tri-(isopropylphenyl)phosphate, resorcinol-crosslinked diphosphate, and bisphenol A-crosslinked diphosphate. The phosphoric acid ester is preferably an oligomeric phosphoric acid ester derived from bisphenol A.

The content of the phosphorus-containing compound is preferably 2% by weight or more, more preferably 4% by weight or more, and preferably 18% by weight or less, more preferably 15% by weight or less based on 100% by weight of the resin sheet. When the content of the phosphorus-containing compound is the above-described lower limit or more, the flame retardancy can be further enhanced. When the content of the phosphorus-containing compound is the above-described upper limit or less, the impact resistance can be further enhanced.

The content of the phosphorus-containing compound is preferably 3 parts by weight or more, more preferably 5 parts by weight or more, still more preferably 7 parts by weight or more, and preferably 25 parts by weight or less, more preferably 20 parts by weight or less based on 100 parts by weight of the aromatic polycarbonate resin. When the content of the phosphorus-containing compound is the above-described lower limit or more, the flame retardancy can be further enhanced. When the content of the phosphorus-containing compound is the above-described upper limit or less, the impact resistance can be further enhanced.

[Silicon-Containing Compound]

The resin sheet according to the present invention includes a silicon-containing compound. The silicon-containing compound is preferably a silicone-based flame retardant. Because the resin sheet includes the silicon-containing compound, the flame retardancy can be enhanced. When the resin sheet does not include the silicon-containing compound, the flame retardancy is sometimes inferior. As the silicon-containing compound, silicon-containing compounds may be used singly, or in combination of two or more kinds thereof.

The silicon-containing compound needs to be a compound containing a silicon atom.

From the viewpoint of further enhancing the flame retardancy, the silicon-containing compound is preferably a polyorganosiloxane.

From the viewpoint of still further enhancing the flame retardancy, the polyorganosiloxane preferably has an aromatic skeleton. Examples of the polyorganosiloxane having an aromatic skeleton include polydiphenylsiloxane, polymethylphenylsiloxane, polydimethyldiphenylsiloxane, and cyclic siloxanes having a phenyl group.

The polyorganosiloxane may have a functional group such as a silanol group, an epoxy group, a silanol group, an epoxy group, an alkoxy group, a hydrosilyl group, or a vinyl group. When the polyorganosiloxane has such a functional group, the compatibility between the polyorganosiloxane and the aromatic polycarbonate resin can be improved, and the reactivity at the time of burning can be improved, and as a result, the flame retardancy can be enhanced.

When the polyorganosiloxane has the silanol group, the content rate of the silanol group is preferably 1% by weight or more, more preferably 2% by weight or more, still more preferably 3% by weight or more, and particularly preferably 5% by weight or more based on 100% by weight of the polyorganosiloxane. When the polyorganosiloxane has the silanol group, the content rate of the silanol group is preferably 10% by weight or less, more preferably 9% by weight or less, still more preferably 8% by weight or less, and particularly preferably 7.5% by weight or less based on 100% by weight of the polyorganosiloxane. When the content rate of the silanol group is the above-described lower limit or more and the above-described upper limit or less, the flame retardancy can be further enhanced. When the content rate of the silanol group is more than 10% by weight, the resin composition sometimes has lower thermal stability and lower moist heat stability than in the case of the content rate of 10% by weight or less.

When the polyorganosiloxane has the alkoxy group, the content rate of the alkoxy group is preferably 10% by weight or less based on 100% by weight of the polyorganosiloxane. When the content rate of the alkoxy group is the above-described upper limit or less, the flame retardancy can be further enhanced. When the content rate of the alkoxy group is more than 10% by weight, the resin composition sometimes more easily gels than in the case of the content rate of 10% by weight or less.

The silicon-containing compound and the polyorganosiloxane preferably have a molecular weight of 450 or more, more preferably 1,000 or more, still more preferably 1,500 or more, particularly preferably 1,700 or more, and preferably 300,000 or less, more preferably 100,000 or less, still more preferably 20,000 or less, particularly preferably 15,000 or less. When the silicon-containing compound and the polyorganosiloxane have a molecular weight of the above-described lower limit or more, the heat resistance of the silicon-containing compound and the polyorganosiloxane can be enhanced. When the silicon-containing compound and the polyorganosiloxane have a molecular weight of the above-described upper limit or less, the stability of the resin composition can be enhanced, the dispersibility of the silicon-containing compound and the polyorganosiloxane in the resin sheet can be enhanced, and the flame retardancy can be enhanced.

When the silicon-containing compound and the polyorganosiloxane are not a polymer and when the structural formulae of the silicon-containing compound and the polyorganosiloxane can be specified, the molecular weights of the silicon-containing compound and the polyorganosiloxane mean a molecular weight that can be calculated from each of the structural formulae. When the silicon-containing compound and the polyorganosiloxane are a polymer, the molecular weights of the silicon-containing compound and the polyorganosiloxane mean a molecular weight in terms of polystyrene measured by gel permeation chromatography (GPC).

The silicon-containing compound may be a silicon-containing particle. The silicon-containing particle is a particle that contains silicon.

The silicon-containing compound is preferably a core-shell particle including a core and a shell placed on the surface of the core. That is, the resin sheet preferably includes a core-shell particle including a core and a shell placed on the surface of the core. It is also preferable that the resin sheet include the silicon-containing compound as the core-shell particle. The core-shell particle may have a silicon atom in the core or in the shell. When the core-shell particle has a silicon atom in the core, in the shell, or in the core and the shell, the whole core-shell particle can be regarded as a silicon-containing compound. When the silicon-containing compound is a core-shell particle, the impact resistance in addition to the flame retardancy can be enhanced.

From the viewpoint of further enhancing the flame retardancy, it is preferable that the organic compound included in the core and the organic compound included in the shell be chemically bonded in the core-shell particle. The chemical bond is preferably a graft bond.

Examples of the core-shell particle include silicone-based core-shell rubbery polymers such as silicone-acrylate-methylmethacrylate copolymers and silicone-acrylate-acrylonitrile-styrene copolymers. The core-shell particle preferably has a core-shell rubber structure.

From the viewpoints of improving the appearance of the resin sheet and further enhancing the impact resistance, the core-shell particle preferably has a volume average particle diameter (D50) of 100 nm or more, more preferably 250 nm or more, and preferably 800 nm or less. The core-shell particle having a volume average particle diameter (D50) of the above-described lower limit or more and the above-described upper limit or less can be prepared by an emulsion polymerization method.

The volume average particle diameter of the core-shell particle is an average diameter measured on a volume basis, and is a value of a median diameter (D50) that is a 50% particle diameter. The volume average particle diameter (D50) can be measured by a laser diffraction/scattering method, an image analysis method, a Coulter method, a centrifugal sedimentation method, or the like. The volume average particle diameter (D50) of the core-shell particle is preferably determined by measurement by a laser diffraction/scattering method.

As the core-shell particle, commercially available products can also be used. Examples of the commercially available product of the core-shell particle include METABLEN S-2001, S-2006, S-2501, S-2030, S-2100, S-2200, SRK200A, SX-005, and SX-006 (all manufactured by Mitsubishi Rayon Co., Ltd.).

The content of the silicon-containing compound is preferably 1% by weight or more, more preferably 2% by weight or more, and preferably 15% by weight or less, more preferably 12% by weight or less based on 100% by weight of the resin sheet. When the content of the silicon-containing compound is the above-described lower limit or more, the flame retardancy can be further enhanced. When the content of the silicon-containing compound is the above-described upper limit or less, the impact resistance can be further enhanced.

When the resin sheet includes the silicon-containing compound as the core-shell particle, the content of the core-shell particle is preferably 1% by weight or more, more preferably 2% by weight or more, and preferably 15% by weight or less, more preferably 12% by weight or less based on 100% by weight of the resin sheet. When the content of the core-shell particle is the above-described lower limit or more, the flame retardancy can be further enhanced. When the content of the core-shell particle is the above-described upper limit or less, the impact resistance can be further enhanced.

The content of the silicon-containing compound is preferably 2 parts by weight or more, more preferably 4 parts by weight or more, and preferably 20 parts by weight or less, more preferably 15 parts by weight or less based on 100 parts by weight of the aromatic polycarbonate resin. When the content of the silicon-containing compound is the above-described lower limit or more, the flame retardancy can be further enhanced. When the content of the silicon-containing compound is the above-described upper limit or less, the impact resistance can be further enhanced.

When the resin sheet includes the silicon-containing compound as the core-shell particle, the content of the core-shell particle is preferably 2 parts by weight or more, more preferably 4 parts by weight or more, and preferably 20 parts by weight or less, more preferably 15 parts by weight or less based on 100 parts by weight of the aromatic polycarbonate resin. When the content of the core-shell particle is the above-described lower limit or more, the flame retardancy can be further enhanced. When the content of the core-shell particle is the above-described upper limit or less, the impact resistance can be further enhanced.

[Fluorine-Based Resin]

The resin sheet according to the present invention preferably includes a fluorine-based resin. The resin composition preferably includes a fluorine-based resin. Because the resin sheet includes the fluorine-based resin, the flame retardancy can be further enhanced. As the fluorine-based resin, fluorine-based resins may be used singly, or in combination of two or more kinds thereof.

Examples of the fluorine-based resin include homopolymers having a fluorinated alpha-olefin monomer as a structural unit, and copolymers having a structural unit including a fluorinated alpha-olefin monomer.

The term "fluorinated alpha-olefin monomer" refers to an alpha-olefin monomer containing a substituent having at least one fluorine atom.

Examples of the fluorinated alpha-olefin monomer include tetrafluoroethylene ($CF_2=CF_2$), $CHF=CF_2$, vinylidene fluoride ($CH_2=CF_2$), $CH_2=CHF$, chlorotrifluoroethylene ($CClF=CF_2$), $CCl_2=CF_2$, $CClF=CClF$, $CHF=CCl_2$, $CH_2=CClF$, $CCl_2=CClF$, hexafluoropropylene ($CF_2=CFCF_3$), $CF_3CF=CHF$, $CF_3CH=CF_2$, $CF_3CH=CH_2$, $CF_3CF=CHF$, $CHF_2CH=CHF$, and $CF_3CH=CH_2$.

Examples of the fluorine-based resin include a poly(tetrafluoroethylene) homopolymer (PTFE), poly(hexafluoroethylene), poly(tetrafluoroethylene-hexafluoroethylene), and poly(tetrafluoroethylene-ethylene-propylene). The poly(tetrafluoroethylene) homopolymer (PTFE) may be a fiber-forming or non-fiber-forming homopolymer.

The content of the fluorine-based resin is preferably 0.01% by weight or more, more preferably 0.1% by weight or more, and preferably 1.5% by weight or less, more preferably 1% by weight or less based on 100% by weight of the resin sheet. When the content of the fluorine-based resin is the above-described lower limit or more, the flame retardancy can be further enhanced. When the content of the fluorine-based resin is the above-described upper limit or less, the impact resistance can be further enhanced.

The content of the fluorine-based resin is preferably 0.3 parts by weight or more, more preferably 0.5 parts by weight or more, and preferably 2 parts by weight or less, more preferably 1.5 parts by weight or less based on 100 parts by weight of the aromatic polycarbonate resin. When the content of the fluorine-based resin is the above-described lower limit or more, the flame retardancy can be further enhanced. When the content of the fluorine-based resin is the above-described upper limit or less, the impact resistance can be further enhanced.

[Another Component]

The resin sheet may include another component as long as an object of the present invention is not impaired. The resin composition may include another component as long as an object of the present invention is not impaired.

Examples of another component include drip inhibitors, antioxidants, heat stabilizers, light stabilizers, UV absorbers, colorants, plasticizers, lubricants, mold release agents, and reinforcing agents. As another component, the above-described components may be used singly, or in combination of two or more kinds thereof.

When the resin sheet includes another component described above, the content of the component is not particularly limited, and for example, is preferably 0.01 parts by weight or more, more preferably 0.1 parts by weight or more, still more preferably 0.5 parts by weight or more, and preferably 10 parts by weight or less, more preferably 5 parts by weight or less based on 100 parts by weight of the aromatic polycarbonate resin.

Examples of the antioxidant include alkylated monophenols; alkylated polyphenols; alkylation reaction products of a polyphenol and a diene such as tetrakis[methylene(3,5-di-tert-butyl-4-hydroxyhydrocinnamate)]methane; butylation reaction products of para-cresol or dicyclopentadiene; alkylated hydroquinone; hydroxylated thiodiphenyl ether; alkylidene-bisphenol; benzyl compounds; esters of beta-(3,5-di-tert-butyl-4-hydroxyphenyl)propionate with a monohydric or polyhydric alcohol; esters of beta-(5-tert-butyl-4-hydroxy-3-methylphenyl)propionate with a monohydric or polyhydric alcohol; esters of a thioalkyl compound or a thioaryl compound such as distearylthiopropionate, dilaurylthiopropionate, ditridecylthiodipropionate, octadecyl-3-(3,5-di-tert-butyl-4-hydroxyphenyl)propionate, or pentaerythrityl-tetrakis[3-(3,5-di-tert-butyl-4-hydroxyphenyl) propionate; and amide compounds of beta-(3,5-di-tert-butyl-4-hydroxyphenyl)propionate.

When the resin sheet includes the antioxidant, the content of the antioxidant is preferably 0.01 parts by weight or more, and preferably 0.1 parts by weight or less based on 100 parts by weight of the aromatic polycarbonate resin.

Examples of the light stabilizer include benzotriazoles such as 2-(2-hydroxy-5-methylphenyl)benzotriazole and 2-(2-hydroxy-5-tert-octylphenyl)-benzotriazole; and 2-hydroxy-4-n-octoxybenzophenone.

When the resin sheet includes the light stabilizer, the content of the light stabilizer is preferably 0.01 parts by weight or more, and preferably 5 parts by weight or less based on 100 parts by weight of the aromatic polycarbonate resin.

Examples of the UV absorber include hydroxybenzophenone; hydroxybenzotriazole; hydroxybenzotriazine; cyanoacrylate; oxanilide; benzoxazinone; 2-(2H-benzotriazole-2-yl)-4-(1,1,3,3)-tetramethylbutyl)-phenol; 2-hydroxy-4-n-octyloxybenzophenone; 2-[4,6-bis(2,4-dimethylphenyl)-1,3,5-triazine-2-yl]-5-(octyloxy)-phenol; 2,2'-(1,4-phenylene) bis(4H-3,1-benzoxazine-4-one); 1,3-bis[(2-cyano-3,3-diphenylacryloyl)oxy]-2,2-bis[[(2-cyano-3,3-diphenylacryloyl)oxy]methyl]propane; 2,2'-(1,4-phenylene) bis(4H-3,1-benzoxazine-4-one); 1,3-bis[(2-cyano-3,3-diphenylacryloyl)oxy]-2,2-bis[[(2-cyano-3,3-diphenylacryloyl)oxy]methyl]propane; and inorganic substances having an average particle diameter of 100 nm or less, such as cerium oxide and zinc oxide.

When the resin sheet includes the UV absorber, the content of the UV absorber is preferably 0.01 parts by weight or more, and preferably 5 parts by weight or less based on 100 parts by weight of the aromatic polycarbonate resin.

Examples of the colorant include titanium dioxide, carbon black, and organic dyes.

As the plasticizer, the lubricant, or the mold release agent, the compounds may be used singly, or in combination of two or more kinds thereof. Many of the compounds used as a plasticizer also have the properties of a lubricant and a mold release agent, many of the compounds used as a lubricant also have the properties of a mold release agent and a plasticizer, and many of the compounds used as a mold release agent also have the properties of a plasticizer and a lubricant.

Examples of the plasticizer, the lubricant, and the mold release agent include phthalates such as dioctyl-4,5-epoxyhexahydrophthalate; tris-(octoxycarbonylethyl)isocyanurate; tristearin; poly-alpha-olefin; epoxidized soybean oil; esters; fatty acid esters such as alkyl stearyl esters; stearates such as methyl stearate, stearyl stearate, pentaerythritoltetrastearate; mixtures of a hydrophilic and hydrophobic nonionic surfactant such as a polyethylene glycol polymer, a polypropylene glycol polymer, or a poly(ethylene glycol-co-propylene glycol) copolymer and methyl stearate; mixtures of methyl stearate and a polyethylene-polypropylene glycol copolymer; and waxes such as a beeswax, a montan wax, and a paraffin wax.

When the resin sheet includes the plasticizer, the lubricant, or the mold release agent, the content of the plasticizer, the lubricant, or the mold release agent is preferably 0.1 parts by weight or more, and preferably 1 part by weight or less based on 100 parts by weight of the aromatic polycarbonate resin.

Examples of the reinforcing agent include fibrous reinforcing agents such as glass fibers.

When the resin sheet includes the reinforcing agent, the content of the reinforcing agent is preferably 1 part by weight or more, more preferably 10 parts by weight or more, and preferably 25 parts by weight or less, more preferably 20 parts by weight or less based on 100 parts by weight of the aromatic polycarbonate resin.

The relative amount of another component described above has an important effect on the mechanical properties such as the low smoke concentration, the low smoke toxicity, and the ductility of the resin sheet. When a certain component is blended in a large amount in order to improve a certain property of the resin sheet, there is a possibility that another property will be deteriorated.

[Other Details of Resin Sheet]

Because of the excellent flame retardancy and the excellent impact resistance, the resin sheet according to the present invention is preferably an interior material for transport equipment. Examples of the transport equipment include railway vehicles, aircraft, ships, and automobiles. The resin sheet according to the present invention is preferably an interior material for a railway vehicle, preferably an interior material for an aircraft, preferably an interior material for a ship, and preferably an interior material for an automobile.

The resin sheet according to the present invention is more preferably an extruded sheet molded product.

The resin sheet according to the present invention can be produced by molding the resin composition into a sheet shape. The method for producing the resin sheet preferably includes a step of obtaining a resin sheet by molding the resin composition into a sheet shape by an extruder. In the step of obtaining a resin sheet, a take-up machine preferably has a ratio of the take-up speed to the roll speed of 0.9 or more and 1.2 or less. The method for producing the resin sheet preferably includes the steps (a) to (c) described below. By the method including the steps (a) to (c), the resin sheet can be satisfactorily produced in which the ratio (standard deviation of segmentation areas/average of segmentation areas), the ratio (S1/S2), the average orientation angle θ of the inorganic filler, the average particle diameter D of the inorganic filler, and the average aspect ratio A of the inorganic filler that are described above are in the above-described preferable ranges.

(a) the step of obtaining a resin composition by melt-kneading a mixture containing an aromatic polycarbonate resin, an inorganic filler, a phosphorus-containing compound, and a silicon-containing compound using a twin-screw extruder at a screw rotation speed of 50 rpm or more and 500 rpm or less.

(b) the step of obtaining a pellet-shaped resin composition by cutting the melt-kneaded resin composition using a pelletizer.

(c) the step of obtaining a resin sheet by melting the pellet-shaped resin composition using a single-screw extruder, and then setting the ratio of the take-up speed to the roll speed (take-up speed/roll speed) of a take-up machine to 0.8 or more and 1.2 or less.

In the step (a), the content of each of the aromatic polycarbonate resin, the inorganic filler, the phosphorus-containing compound, and the silicon-containing compound is appropriately adjusted so as to satisfy the above-described preferable range.

In the step (a), the cylinder temperature of the twin-screw extruder is preferably 260° C. or more, more preferably 270° C. or more, and preferably 300° C. or less, more preferably 290° C. or less. When the cylinder temperature of the twin-screw extruder is the above-described lower limit or more and the above-described upper limit or less, the dispersion state of the inorganic filler in the resin sheet can be good, and the flame retardancy and the impact resistance can be further enhanced.

In the step (a), the mold temperature of the twin-screw extruder is preferably 240° C. or more, more preferably 250° C. or more, and preferably 280° C. or less, more preferably 270° C. or less. When the mold temperature of the twin-screw extruder is the above-described lower limit or more and the above-described upper limit or less, the dispersion state of the inorganic filler in the resin sheet can be good, and the flame retardancy and the impact resistance can be further enhanced.

In the step (a), the screw rotation speed of the twin-screw extruder is preferably 300 rpm or more, more preferably 350 rpm or more, and preferably 500 rpm, more preferably 450 rpm or less. When the screw rotation speed of the twin-screw extruder is the above-described lower limit or more and the above-described upper limit or less, the dispersion state of the inorganic filler in the resin sheet can be good, and the flame retardancy and the impact resistance can be further enhanced.

In the step (b), it is preferable to cool, in a water tank, the strand-shaped resin composition extruded in the step (a) and then cut the strand-shaped resin composition.

In the step (b), the pellet-shaped resin composition preferably has an average particle diameter of 0.6 mm or more, more preferably 0.7 mm or more, and preferably 0.9 mm or less, more preferably 1.0 mm or less.

In the step (c), the cylinder temperature of the single-screw extruder is preferably 250° C. or more, more preferably 260° C. or more, and preferably 290° C. or less, more preferably 280° C. or less. When the cylinder temperature of the single-screw extruder is the above-described lower limit or more and the above-described upper limit or less, the dispersion state of the inorganic filler in the resin sheet can be good, and the flame retardancy and the impact resistance can be further enhanced.

In the step (c), the mold temperature of the single-screw extruder is preferably 270° C. or more, more preferably 280° C. or more, and preferably 310° C. or less, more preferably 300° C. or less. When the mold temperature of the single-screw extruder is the above-described lower limit or more and the above-described upper limit or less, the dispersion state of the inorganic filler in the resin sheet can be good, and the flame retardancy and the impact resistance can be further enhanced.

In the step (c), it is preferable to sandwich the molten resin composition with a three-stage roll to uniform the thickness.

In the step of obtaining a resin sheet, the step (c), the ratio of the take-up speed to the roll speed (take-up speed/roll speed) of the take-up machine is preferably 0.9 or more, more preferably 1.00 or more, still more preferably 1.02 or more, particularly preferably 1.04 or more, and preferably 1.07 or less, more preferably 1.10 or less. When the ratio (take-up speed/roll speed) is the above-described lower limit or more and the above-described upper limit or less, the dispersion state of the inorganic filler in the resin sheet can be good, and the flame retardancy and the impact resistance can be further enhanced.

Hereinafter, the present invention will be described in more detail with reference to Examples. The present invention is not limited to Examples described below.

The following materials were prepared.

(Aromatic Polycarbonate Resin)

Aromatic polycarbonate resin (aromatic polycarbonate resin having a structural unit derived from a bisphenol A type compound, "Iupilon E" manufactured by MITSUBISHI GAS CHEMICAL COMPANY, INC., viscosity average molecular weight: 20,000)

(Phosphorus-Containing Compound)

Phosphoric acid ester 1 ("Fyrol Flex Sol DP" manufactured by ILC JAPAN Ltd.)

Phosphoric acid ester 2 ("PX-202" manufactured by DAI-HACHI CHEMICAL INDUSTRY CO., LTD.)

(Silicon-Containing Compound)

Silicone/acrylic core shell rubber ("METABLEN SX-005" manufactured by Mitsubishi Rayon Co., Ltd.)

(Inorganic Filler)

Talc 1 ("Jetfine 3CA" manufactured by Imerys)
Talc 2 ("Jetfine 0.7CA" manufactured by Imerys)
Talc 3 ("HAR W92" manufactured by Imerys)

(Fluorine-Based Resin)

Polytetrafluoroethylene ("Teflon CFP6000" manufactured by DuPont de Nemours, Inc.)

Example 1

The blending components shown in Table 1 below were blended in the blending amounts (parts by weight) shown in Table 1 below to obtain a resin sheet. Specifically, a resin sheet was obtained by the following method.

(a) Step of Obtaining Resin Composition:

Using a twin-screw extruder ("TEX30a" manufactured by The Japan Steel Works, Ltd.), the mixture obtained by blending in the blending amounts shown in Table 1 was melt-kneaded under conditions of a cylinder temperature of 280° C., a mold temperature of 260° C., a pressure of 0.7 bar (vacuum), a screw diameter of 30 mm, a rotation speed of 400 rpm, and an extrusion rate of 15 kg/hour, and then melt-extruded.

(b) Step of Obtaining Pellet-Shaped Resin Composition:

The resin composition obtained by melt extrusion was cooled by water cooling, cut into a pellet using a pelletizer, and then dried at approximately 120° C. for approximately 5 hours to obtain a pellet-shaped resin composition.

(c) Step of Obtaining Resin Sheet:

Using a single-screw extruder ("GT50" manufactured by Research Laboratory of Plastics Technology Co., Ltd.), the pellet-shaped resin composition was molten under the conditions of a cylinder temperature of 270° C., a mold temperature of 290° C., and an extrusion rate of 20 kg/hour, and then molded into a sheet. Next, the ratio of the take-up speed to the roll speed (take-up speed/roll speed) of a take-up machine was set to 1.05, and the molded product was taken up to obtain a resin sheet having a thickness of 3 mm.

Examples 2 to 13

A resin sheet having a thickness of 3 mm was prepared in the same manner as in Example 1 except that the composition of the resin composition (and the resin sheet) was set as shown in Tables 1 and 2 below.

Examples 14 to 26

A resin sheet having a thickness of 3 mm was prepared in the same manner as in Example 1 except that the composition of the resin composition (and the resin sheet) was set as shown in Tables 3 and 4 below and that in the step of obtaining a resin sheet (c), the ratio of the take-up speed to the roll speed (take-up speed/roll speed) of the take-up machine was set to 1.00.

Comparative Example 1

A resin sheet having a thickness of 3 mm was prepared in the same manner as in Example 1 except that the composition of the resin composition (and the resin sheet) was set as shown in Table 5 below and that in the step of obtaining a resin composition (a), the cylinder temperature was 240° C., the mold temperature was 240° C., and the rotation speed was 100 rpm.

Comparative Examples 2 to 13

A resin sheet having a thickness of 3 mm was prepared in the same manner as in Comparative Example 1 except that the composition of the resin composition (and the resin sheet) was set as shown in Tables 5 and 6 below.

Comparative Examples 14 to 26

A resin sheet having a thickness of 3 mm was prepared in the same manner as in Comparative Example 1 except that the composition of the resin composition (and the resin sheet) was set as shown in Tables 7 and 8 below and that in the step of obtaining a resin sheet (c), the ratio of the take-up speed to the roll speed (take-up speed/roll speed) of the take-up machine was set to 1.00.

Comparative Examples 27 to 29

A resin sheet having a thickness of 3 mm was prepared in the same manner as in Example 1 except that the composition of the resin composition (and the resin sheet) was set as shown in Table 9 below.

(Evaluation)

(1) Photographing with Electron Microscope

The obtained resin sheet has a first surface on one side in the thickness direction. The resin sheet was subjected to machining to prepare a measurement sample A (length 5 mm×width 5 mm×thickness 3 mm) of the resin sheet in which a section A in a direction parallel to the first surface is exposed. Furthermore, the resin sheet was subjected to machining to prepare a measurement sample B (length 5 mm×width 5 mm×thickness 3 mm) of the resin sheet in which a section B in the direction perpendicular to the first surface is exposed. In the measurement sample B, a section along the MD direction was exposed as the section B. The section A is a section at the center in the thickness direction of the resin sheet.

Using an ultramicrotome "Leica, REICHERT-NISSEI ULTRACUT S" manufactured by Leica Microsystems, the exposed sections A and B in the measurement samples A and B were surface-polished.

Using a scanning electron microscope ("SU3500" manufactured by Hitachi High-Technologies Corporation, measurement magnification: 2,000 times, condition: low vacuum mode), the section A in the obtained measurement sample A and the section B in the obtained measurement sample B were photographed. In all electron micrographs of the photographed sections A and B in the resin sheets other than the resin sheet obtained in Comparative Example 27, 100 or more inorganic fillers having a sectional area (projected area) of more than 0.1 $\mu m^2$ were present.

FIG. 4 is an electron micrograph of a section, of the resin sheet prepared in Example, in a direction parallel to the first surface. Specifically, FIG. 4 is an electron micrograph of the section A in the measurement sample A prepared in Example 1 (magnification: 2,000 times). The ratio of the area occupied S1 determined from the electron micrograph in FIG. 4 was 10.64%.

FIG. 5 is an electron micrograph of a section, of the resin sheet prepared in Example, in the direction perpendicular to the first surface. Specifically, FIG. 5 is an electron micrograph of the section B in the measurement sample B prepared in Example 1 (magnification: 2,000 times). The ratio of the area occupied S2 determined from the electron micrograph in FIG. 5 was 4.63%. The ratio of S1 to S2 (S1/S2) calculated from the resulting S1 and S2 was 2.30.

(2) Ratio (Standard Deviation of Segmentation Areas/Average of Segmentation Areas)

From the electron micrograph of the section B, each segmentation area of the inorganic filler was calculated by a segmentation method using image analysis software ("Win-ROOF2015" manufactured by MITANI CORPORATION). More specifically, the Voronoi division was performed using each centroid of the inorganic filler as a generating point, and the area of each Voronoi region of the inorganic filler was calculated. Then, the ratio of the standard deviation of the resulting areas of the Voronoi regions to the average of the areas of the Voronoi regions (standard deviation of areas of Voronoi regions/average of areas of Voronoi regions) was calculated. The areas of the Voronoi regions of 100 or more of the arbitrarily selected inorganic fillers were each determined.

(3) Average Orientation Angle θ of Inorganic Filler

From the electron micrograph of the section B, each orientation angle θ of the inorganic filler was calculated using image analysis software ("WinROOF2015" manufactured by MITANI CORPORATION), and the average of the calculated orientation angles θ was determined. The average orientation angle θ of the inorganic filler was calculated from 100 or more of the inorganic fillers.

(4) Ratio (S1/S2)

From the electron micrograph of the section A, the ratio of the area occupied by the inorganic filler in the section A per unit area (%) was calculated using image analysis software ("WinROOF2015" manufactured by MITANI CORPORATION). The ratio of the area occupied was represented by S1(%). From the electron micrograph of the section B, the ratio of the area occupied by the inorganic filler in the section B per unit area (%) was calculated using image analysis software ("WinROOF2015" manufactured by MITANI CORPORATION). The ratio of the area occupied was represented by S2(%). S1 and S1 described above were calculated by the formulae described below. S1 and S1 were calculated from 100 or more of the inorganic fillers.

$S1(\%)$=total of projected areas of inorganic filler/area of observation visual field of section $A \times 100$ $S2(\%)$=total of projected areas of inorganic filler/area of observation visual field of section $B \times 100$ From the resulting S1 and S2, the ratio of S1 to S2 (S1/S2) was calculated.

(5) Average Particle Diameter D of Inorganic Filler

From the electron micrograph of the section B, each particle diameter (equivalent circle diameter) of the inorganic filler was calculated using image analysis software ("WinROOF2015" manufactured by MITANI CORPORATION), and the average of the calculated equivalent circle diameters was determined and regarded as the average particle diameter D. The average particle diameter D was calculated from 100 or more of the inorganic fillers.

(6) Average Aspect Ratio A of Inorganic Filler

From the electron micrograph of the section B, each aspect ratio (long diameter/short diameter) of the inorganic filler was calculated using image analysis software ("WinROOF2015" manufactured by MITANI. CORPORATION), and the average of the calculated aspect ratios was determined and regarded as the average aspect ratio A. The average aspect ratio A was calculated from 100 or more of the inorganic fillers.

(7) Average Maximum Heat Generation Rate

The obtained resin sheet was cut into a sample having a length of 100 mm×a width of 100 mm×a thickness of 3 mm to obtain a sample for measuring the heat generation rate. The obtained sample for measuring the heat generation rate was measured in accordance with ISO5660-1 with a cone calorimeter test device under conditions of heater radiant heat of 50 kW/m$^2$ and a measurement time of 20 minutes using an ignition to determine the heat generation rate.

From the measured heat generation rate, the average maximum heat generation rate was determined in accordance with EN45545-2. In this evaluation, n in the above-described formula of the average heat generation rate was set to 600.

[Criteria for Average Maximum Heat Generation Rate]
○: 130 kW/m$^2$ or less
Δ: More than 130 kW/m$^2$ and 140 kW/m$^2$ or less
x: More than 140 kW/m$^2$ (8) Izod Impact Strength The obtained resin sheet was cut into a sample having a length of 80 mm×a width of 10 mm×a thickness of 3 mm, and the sample was indented to have a 2 mm V-notch. The Izod impact strength was measured in accordance with JIS K7110: 1999.

[Criteria for Izod Impact Strength]
○: 22 kJ/m$^2$ or more
Δ: 20 kJ/m$^2$ or more and less than 22 kJ/m$^2$
x: Less than 20 kJ/m$^2$ (9) Comprehensive Judgment From the evaluation results of (7) average maximum heat generation rate and (8) Izod impact strength, the comprehensive judgment was performed in accordance with the following criteria.

[Criteria for Comprehensive Judgment]
○○: Evaluation results of (7) and (8) described above are both ○
○: One of evaluation results of (7) and (8) described above is ○, and the other is Δ
Δ: Evaluation results of (7) and (8) described above are both Δ
x: At least one of evaluation results of (7) and (8) described above is x The configurations of the resin sheets and the results are shown in Tables 1 to 9 below.

TABLE 1

| | | | Example 1 | Example 2 | Example 3 | Example 4 | Example 5 | Example 6 |
|---|---|---|---|---|---|---|---|---|
| Composition | Aromatic polycarbonate resin | Part by weight | 100 | 100 | 100 | 100 | 100 | 100 |
| | Phosphorus-containing compound | Phosphoric acid ester 1 | Part by weight | 15 | 15 | 15 | 15 | | 15 |
| | | Phosphoric acid ester 2 | Part by weight | | | | | 15 | |
| | Silicon-containing compound | Silicone/acrylic core shell rubber | Part by weight | 7 | 7 | 7 | 7 | 7 | 7 |
| | Inorganic filler | Talc1 | Part by weight | 23 | | | | 23 | 15 |
| | | Talc2 | Part by weight | | 23 | | 23 | | |
| | | Talc3 | Part by weight | | | 23 | | | |
| | Fluorine-based resin | Polytetrafluoroethylene | Part by weight | | | | | | |
| Evaluation | Ratio (standard deviation of segmentation areas/average of segmentation areas) | | — | 0.42 | 0.45 | 0.42 | 0.52 | 0.44 | 0.52 |
| | Average orientation angle θ of inorganic filler | | degree | 15 | 16 | 18 | 21 | 24 | 21 |
| | Ratio (S1/S2) | | — | 2.30 | 2.21 | 2.45 | 2.21 | 2.10 | 2.31 |
| | Average particle diameter D of inorganic filler | | μm | 0.70 | 0.81 | 1.12 | 0.75 | 0.81 | 0.89 |
| | Average aspect ratio A of inorganic filler | | | 2.67 | 2.31 | 2.11 | 2.33 | 2.54 | 2.26 |
| | Average maximum heat generation rate | | kW/m$^2$ | 118 | 121 | 132 | 128 | 125 | 123 |
| | Judgment | | | ○ | ○ | Δ | ○ | ○ | Δ |

TABLE 1-continued

|  |  | Example 1 | Example 2 | Example 3 | Example 4 | Example 5 | Example 6 |
|---|---|---|---|---|---|---|---|
| Izod impact strength | kJ/m² | 23.3 | 22.2 | 24.1 | 21.2 | 24.7 | 22.6 |
|  | Judgment | ○ | ○ | ○ | Δ | ○ | ○ |
| Comprehensive judgment | Judgment | ○○ | ○○ | ○ | ○ | ○○ | ○ |

TABLE 2

|  |  |  | Example 7 | Example 8 | Example 9 | Example 10 | Example 11 | Example 12 | Example 13 |
|---|---|---|---|---|---|---|---|---|---|
| Composition | Aromatic polycarbonate resin | Part by weight | 100 | 100 | 100 | 100 | 100 | 100 | 100 |
|  | Phosphorus-containing compound | Phosphoric acid ester 1 | Part by weight | 15 |  | 10 | 10 | 20 | 10 | 10 |
|  |  | Phosphoric acid ester 2 | Part by weight |  | 20 |  |  |  |  |  |
|  | Silicon-containing compound | Silicone/acrylic core shell rubber | Part by weight | 7 | 7 | 7 | 7 | 7 | 7 | 7 |
|  | Inorganic filler | Talc1 | Part by weight | 30 |  |  | 23 | 23 | 23 | 23 |
|  |  | Talc2 | Part by weight |  | 23 |  |  |  |  |  |
|  |  | Talc3 | Part by weight |  |  | 23 |  |  |  |  |
|  | Fluorine-based resin | Polytetrafluoroethylene | Part by weight |  |  |  |  |  | 0.1 | 0.05 |
| Evaluation | Ratio (standard deviation of segmentation areas/average of segmentation areas) |  | — | 0.51 | 0.52 | 0.47 | 0.49 | 0.50 | 0.51 | 0.51 |
|  | Average orientation angle θ of inorganic filler | degree | 23 | 19 | 23 | 19 | 22 | 22 | 19 |
|  | Ratio (S1/S2) | — | 2.11 | 2.22 | 2.34 | 2.11 | 2.21 | 2.09 | 2.26 |
|  | Average particle diameter D of inorganic filler | μm | 0.79 | 0.71 | 1.08 | 0.70 | 0.89 | 0.86 | 0.86 |
|  | Average aspect ratio A of inorganic filler | — | 2.65 | 2.20 | 2.17 | 2.56 | 2.78 | 2.67 | 2.67 |
|  | Average maximum heat generation rate | kW/m² | 122 | 120 | 133 | 134 | 119 | 118 | 117 |
|  | Judgment |  | ○ | ○ | Δ | Δ | ○ | ○ | ○ |
|  | Izod impact strength | kJ/m² | 20.1 | 21.1 | 22.3 | 23.3 | 20.7 | 23.2 | 22.4 |
|  | Judgment |  | Δ | Δ | ○ | ○ | Δ | ○ | ○ |
|  | Comprehensive judgment | Judgment | ○ | ○ | ○ | ○ | ○ | ○○ | ○○ |

TABLE 3

|  |  |  | Example 14 | Example 15 | Example 16 | Example 17 | Example 18 | Example 19 |
|---|---|---|---|---|---|---|---|---|
| Composition | Aromatic polycarbonate resin | Part by weight | 100 | 100 | 100 | 100 | 100 | 100 |
|  | Phosphorus-containing compound | Phosphoric acid ester 1 | Part by weight | 15 | 15 | 15 | 15 |  | 15 |
|  |  | Phosphoric acid ester 2 | Part by weight |  |  |  |  | 15 |  |
|  | Silicon-containing compound | Silicone/acrylic core shell rubber | Part by weight | 7 | 7 | 7 | 7 | 7 | 7 |
|  | Inorganic filler | Talc1 | Part by weight | 23 |  |  |  | 23 | 15 |
|  |  | Talc2 | Part by weight |  | 23 |  | 23 |  |  |
|  |  | Talc3 | Part by weight |  |  | 23 |  |  |  |
|  | Fluorine-based resin | Polytetrafluoroethylene | Part by weight |  |  |  |  |  |  |
| Evaluation | Ratio (standard deviation of segmentation areas/average of segmentation areas) | — | 0.43 | 0.47 | 0.41 | 0.51 | 0.44 | 0.50 |
|  | Average orientation angle θ of inorganic filler | degree | 32 | 33 | 35 | 36 | 37 | 34 |
|  | Ratio (S1/S2) | — | 1.89 | 1.88 | 1.95 | 1.76 | 1.68 | 1.79 |
|  | Average particle diameter D of inorganic filler | μm | 0.72 | 0.82 | 1.14 | 0.88 | 0.79 | 0.87 |
|  | Average aspect ratio A of inorganic filler | — | 2.65 | 2.21 | 2.04 | 2.32 | 2.69 | 2.36 |

TABLE 3-continued

|  |  | Example 14 | Example 15 | Example 16 | Example 17 | Example 18 | Example 19 |
|---|---|---|---|---|---|---|---|
| Average maximum heat generation rate | kW/m² | 123 | 129 | 138 | 135 | 128 | 132 |
|  | Judgment | ○ | ○ | Δ | Δ | ○ | Δ |
| Izod impact strength | kJ/m² | 22.2 | 23.4 | 23.8 | 20.3 | 23.1 | 23.0 |
|  | Judgment | ○ | ○ | ○ | Δ | ○ | ○ |
| Comprehensive judgment | Judgment | ○○ | ○○ | ○ | Δ | ○○ | ○○ |

TABLE 4

|  |  |  |  | Example 20 | Example 21 | Example 22 | Example 23 | Example 24 | Example 25 | Example 26 |
|---|---|---|---|---|---|---|---|---|---|---|
| Composition | Aromatic polycarbonate resin |  | Part by weight | 100 | 100 | 100 | 100 | 100 | 100 | 100 |
|  | Phosphorus-containing compound | Phosphoric acid ester 1 | Part by weight | 15 |  | 10 | 10 | 20 | 10 | 10 |
|  |  | Phosphoric acid ester 2 | Part by weight |  | 20 |  |  |  |  |  |
|  | Silicon-containing compound | Silicone/acrylic core shell rubber | Part by weight | 7 | 7 | 7 | 7 | 7 | 7 | 7 |
|  | Inorganic filler | Talc1 | Part by weight | 30 |  |  | 23 | 23 | 23 | 23 |
|  |  | Talc2 | Part by weight |  | 23 |  |  |  |  |  |
|  |  | Talc3 | Part by weight |  |  | 23 |  |  |  |  |
|  | Fluorine-based resin | Polytetrafluoroethylene | Part by weight |  |  |  |  |  | 0.1 | 0.05 |
| Evaluation | Ratio (standard deviation of segmentation areas/average of segmentation areas) |  | — | 0.48 | 0.50 | 0.53 | 0.50 | 0.48 | 0.47 | 0.47 |
|  | Average orientation angle θ of inorganic filler |  | degree | 32 | 31 | 38 | 34 | 35 | 33 | 33 |
|  | Ratio (S1/S2) |  | — | 1.68 | 1.71 | 1.80 | 1.79 | 1.90 | 1.86 | 1.78 |
|  | Average particle diameter D of inorganic filler |  | μm | 0.80 | 0.72 | 1.05 | 0.72 | 0.90 | 0.87 | 0.85 |
|  | Average aspect ratio A of inorganic filler |  | — | 2.78 | 2.31 | 2.00 | 2.49 | 2.76 | 2.59 | 2.66 |
|  | Average maximum heat generation rate |  | kW/m² | 128 | 128 | 138 | 136 | 129 | 120 | 122 |
|  |  |  | Judgment | ○ | ○ | Δ | Δ | ○ | ○ | ○ |
|  | Izod impact strength |  | kJ/m² | 21.3 | 22.9 | 21.6 | 23.4 | 21.4 | 21.9 | 21 |
|  |  |  | Judgment | Δ | ○ | Δ | ○ | Δ | Δ | ○ |
|  | Comprehensive judgment |  | Judgment | ○ | ○○ | Δ | ○ | ○ | ○ | ○○ |

TABLE 5

|  |  |  |  | Comparative Example 1 | Comparative Example 2 | Comparative Example 3 | Comparative Example 4 | Comparative Example 5 | Comparative Example 6 |
|---|---|---|---|---|---|---|---|---|---|
| Composition | Aromatic polycarbonate resin |  | Part by weight | 100 | 100 | 100 | 100 | 100 | 100 |
|  | Phosphorus-containing compound | Phosphoric acid ester 1 | Part by weight | 15 | 15 | 15 | 15 |  | 15 |
|  |  | Phosphoric acid ester 2 | Part by weight |  |  |  |  | 15 |  |
|  | Silicon-containing compound | Silicone/acrylic core shell rubber | Part by weight | 7 | 7 | 7 | 7 | 7 | 7 |
|  | Inorganic filler | Talc1 | Part by weight | 23 |  |  | 23 | 23 | 15 |
|  |  | Talc2 | Part by weight |  | 23 |  |  |  |  |
|  |  | Talc3 | Part by weight |  |  | 23 |  |  |  |
|  | Fluorine-based resin | Polytetrafluoroethylene | Part by weight |  |  |  |  |  |  |
| Evaluation | Ratio (standard deviation of segmentation areas/average of segmentation areas) |  | — | 0.62 | 0.56 | 0.64 | 0.63 | 0.56 | 0.61 |
|  | Average orientation angle θ of inorganic filler |  | degree | 22 | 23 | 20 | 21 | 24 | 18 |
|  | Ratio (S1/S2) |  | — | 2.21 | 2.31 | 2.30 | 2.43 | 2.19 | 2.32 |
|  | Average particle diameter D of inorganic filler |  | μm | 0.81 | 0.83 | 1.11 | 0.80 | 0.87 | 0.87 |

TABLE 5-continued

|  |  | Comparative Example 1 | Comparative Example 2 | Comparative Example 3 | Comparative Example 4 | Comparative Example 5 | Comparative Example 6 |
|---|---|---|---|---|---|---|---|
| Average aspect ratio A of inorganic filler | — | — | 2.78 | 2.43 | 2.10 | 2.23 | 2.76 | 2.26 |
| Average maximum heat generation rate | kW/m$^2$ | 158 | 148 | 156 | 151 | 146 | 155 |
|  | Judgment | x | x | x | x | x | x |
| Izod impact strength | kJ/m$^2$ | 17.8 | 21.1 | 18 | 19.7 | 20.6 | 22.1 |
|  | Judgment | x | Δ | x | x | Δ | ○ |
| Comprehensive judgment | Judgment | x | x | x | x | x | x |

TABLE 6

|  |  |  |  | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|
| Composition | Aromatic polycarbonate resin |  | Part by weight | 100 | 100 | 100 | 100 | 100 | 100 | 100 |
|  | Phosphorus-containing compound | Phosphoric acid ester 1 | Part by weight | 15 |  | 10 | 10 | 20 | 10 | 10 |
|  |  | Phosphoric acid ester 2 | Part by weight |  | 20 |  |  |  |  |  |
|  | Silicon-containing compound | Silicone/acrylic core shell rubber | Part by weight | 7 | 7 | 7 | 7 | 7 | 7 | 7 |
|  | Inorganic filler | Talc1 | Part by weight | 30 |  |  | 23 | 23 | 23 | 23 |
|  |  | Talc2 | Part by weight |  | 23 |  |  |  |  |  |
|  |  | Talc3 | Part by weight |  |  | 23 |  |  |  |  |
|  | Fluorine-based resin | Polytetrafluoroethylene | Part by weight |  |  |  |  |  | 0.1 | 0.5 |
| Evaluation | Ratio (standard deviation of segmentation areas/average of segmentation areas) |  | — | 0.55 | 0.59 | 0.58 | 0.60 | 0.57 | 0.56 | 0.56 |
|  | Average orientation angle θ of inorganic filler |  | degree | 19 | 22 | 23 | 20 | 20 | 22 | 23 |
|  | Ratio (S1/S2) |  | — | 2.22 | 2.27 | 2.34 | 2.33 | 2.43 | 2.12 | 2.31 |
|  | Average particle diameter D of inorganic filler |  | μm | 0.80 | 0.72 | 1.00 | 0.87 | 0.89 | 0.92 | 0.85 |
|  | Average aspect ratio A of inorganic filler |  | — | 2.56 | 2.34 | 2.01 | 2.61 | 2.65 | 2.56 | 2.70 |
|  | Average maximum heat generation rate |  | kW/m$^2$ | 146 | 150 | 152 | 148 | 152 | 146 | 145 |
|  |  |  | Judgment | x | x | x | x | x | x | x |
|  | Izod impact strength |  | kJ/m$^2$ | 17.8 | 18.8 | 21.2 | 21.4 | 18.9 | 18.7 | 18.4 |
|  |  |  | Judgment | x | x | Δ | Δ | x | x | x |
|  | Comprehensive judgment |  | Judgment | x | x | x | x | x | x | x |

TABLE 7

|  |  |  |  | Comparative Example 14 | Comparative Example 15 | Comparative Example 16 | Comparative Example 17 | Comparative Example 18 | Comparative Example 19 |
|---|---|---|---|---|---|---|---|---|---|
| Composition | Aromatic polycarbonate resin |  | Part by weight | 100 | 100 | 100 | 100 | 100 | 100 |
|  | Phosphorus-containing compound | Phosphoric acid ester 1 | Part by weight | 15 | 15 | 15 | 15 |  | 15 |
|  |  | Phosphoric acid ester 2 | Part by weight |  |  |  |  | 15 |  |
|  | Silicon-containing compound | Silicone/acrylic core shell rubber | Part by weight | 7 | 7 | 7 | 7 | 7 | 7 |
|  | Inorganic filler | Talc1 | Part by weight | 23 |  |  |  | 23 | 15 |
|  |  | Talc2 | Part by weight |  | 23 |  | 23 |  |  |
|  |  | Talc3 | Part by weight |  |  | 23 |  |  |  |

TABLE 7-continued

|  |  |  | Comparative Example 14 | Comparative Example 15 | Comparative Example 16 | Comparative Example 17 | Comparative Example 18 | Comparative Example 19 |
|---|---|---|---|---|---|---|---|---|
| Evaluation | Fluorine-based resin | Polytetrafluoroethylene | Part by weight | | | | | | |
| | Ratio (standard deviation of segmentation areas/average of segmentation areas) | | — | 0.59 | 0.61 | 0.63 | 0.63 | 0.60 | 0.55 |
| | Average orientation angle θ of inorganic filler | | degree | 33 | 32 | 30 | 31 | 34 | 34 |
| | Ratio (S1/S2) | | — | 1.80 | 1.87 | 1.91 | 1.80 | 1.76 | 1.80 |
| | Average particle diameter D of inorganic filler | | μm | 0.83 | 0.82 | 1.10 | 0.84 | 0.80 | 0.90 |
| | Average aspect ratio A of inorganic filler | | — | 2.75 | 2.40 | 2.10 | 2.22 | 2.78 | 2.30 |
| | Average maximum heat generation rate | | kW/m² | 165 | 152 | 157 | 151 | 150 | 150 |
| | | | Judgment | x | x | x | x | x | x |
| | Izod impact strength | | kJ/m² | 18.9 | 22.1 | 18.1 | 20.4 | 20.1 | 22.2 |
| | | | Judgment | x | ○ | x | Δ | Δ | ○ |
| | Comprehensive judgment | | Judgment | x | x | x | x | x | x |

TABLE 8

|  |  |  |  | Comparative Example 20 | Comparative Example 21 | Comparative Example 22 | Comparative Example 23 | Comparative Example 24 | Comparative Example 25 | Comparative Example 26 |
|---|---|---|---|---|---|---|---|---|---|---|
| Composition | Aromatic polycarbonate resin | | Part by weight | 100 | 100 | 100 | 100 | 100 | 100 | 100 |
| | Phosphorus-containing compound | Phosphoric acid ester 1 | Part by weight | 15 | | 10 | 10 | 20 | 10 | 10 |
| | | Phosphoric acid ester 2 | Part by weight | | 20 | | | | | |
| | Silicon-containing compound | Silicone/acrylic core shell rubber | Part by weight | 7 | 7 | 7 | 7 | 7 | 7 | 7 |
| | Inorganic filler | Talc1 | Part by weight | 30 | | | 23 | 23 | 23 | 23 |
| | | Talc2 | Part by weight | | 23 | | | | | |
| | | Talc3 | Part by weight | | | 23 | | | | |
| | Fluorine-based resin | Polytetrafluoroethylene | Part by weight | | | | | | 0.1 | 0.5 |
| Evaluation | Ratio (standard deviation of segmentation areas/average of segmentation areas) | | — | 0.54 | 0.58 | 0.58 | 0.56 | 0.62 | 0.59 | 0.57 |
| | Average orientation angle θ of inorganic filler | | degree | 32 | 33 | 34 | 34 | 35 | 33 | 30 |
| | Ratio (S1/S2) | | — | 1.88 | 1.72 | 1.80 | 1.75 | 1.90 | 1.96 | 1.87 |
| | Average particle diameter D of inorganic filler | | μm | 0.85 | 0.79 | 1.04 | 0.87 | 0.89 | 0.91 | 0.85 |
| | Average aspect ratio A of inorganic filler | | — | 2.54 | 2.47 | 2.02 | 2.60 | 2.58 | 2.56 | 2.58 |
| | Average maximum heat generation rate | | kW/m² | 146 | 149 | 152 | 148 | 150 | 151 | 147 |
| | | | Judgment | x | x | x | x | x | x | x |
| | Izod impact strength | | kJ/m² | 17.5 | 17.9 | 21 | 20.5 | 19.9 | 19.5 | 18.6 |
| | | | Judgment | x | x | Δ | Δ | x | x | x |
| | Comprehensive judgment | | Judgment | x | x | x | x | x | x | x |

TABLE 9

| | | | Comparative Example 27 | Comparative Example 28 | Comparative Example 29 |
|---|---|---|---|---|---|
| Composition | Aromatic polycarbonate resin | Part by weight | 100 | 100 | 100 |
| | Phosphorus-containing compound — Phosphoric acid ester 1 | Part by weight | 15 | | 15 |
| | Phosphorus-containing compound — Phosphoric acid ester 2 | Part by weight | | | |
| | Silicon-containing compound — Silicone/acrylic core shell rubber | Part by weight | 7 | 7 | |
| | Inorganic filler — Talc1 | Part by weight | | 23 | 23 |
| | Inorganic filler — Talc2 | Part by weight | | | |
| | Inorganic filler — Talc3 | Part by weight | | | |
| | Fluorine-based resin — Polytetrafluoroethylene | Part by weight | | | |
| Evaluation | Ratio (standard deviation of segmentation areas/average of segmentation areas) | — | — | 0.44 | 0.46 |
| | Average orientation angle θ of inorganic filler | degree | — | 23 | 22 |
| | Ratio (S1/S2) | — | — | 2.25 | 2.40 |
| | Average particle diameter D of inorganic filler | μm | — | 0.76 | 0.80 |
| | Average aspect ratio A of inorganic filler | — | — | 2.54 | 2.32 |
| | Average maximum heat generation rate | kW/m$^2$ | 189 | 168 | 160 |
| | | Judgment | x | x | x |
| | Izod impact strength | kJ/m$^2$ | 47.1 | 28.7 | 17.8 |
| | | Judgment | ○ | ○ | x |
| | Comprehensive judgment | Judgment | x | x | x |

The resin sheets obtained in Examples 1 to 26 were excellent in flame retardancy and impact resistance. It is considered that this is because the dispersion state of the inorganic filler in the resin sheet is good.

Meanwhile, in the resin sheets obtained in Comparative Examples 1 to 26, it was impossible to enhance both the flame retardancy and the impact resistance sufficiently. It is considered that this is because the dispersion state of the inorganic filler in the resin sheet is uneven. Furthermore, because the resin sheets obtained in Comparative Examples 27 to 29 do not include any of an inorganic filler, a phosphorus-containing compound, or a silicon-containing compound, it was impossible to enhance both the flame retardancy and the impact resistance sufficiently.

EXPLANATION OF SYMBOLS

1: Resin sheet
1a: First surface
11A: Section
11B: Section
21A: Inorganic filler
21B: Inorganic filler
21Ba: One end
21Bb: The other end

The invention claimed is:

1. A resin sheet comprising an aromatic polycarbonate resin; an inorganic filler; a phosphorus-containing compound; and a silicon-containing compound,
    the resin sheet having a first surface on one side in a thickness direction; and a section in a direction perpendicular to the first surface, the section having segmentation areas of the inorganic filler, and
    the resin sheet having a ratio of a standard deviation of the segmentation areas to an average of the segmentation areas, the ratio being 0.53 or less, the segmentation areas each calculated by a segmentation method.

2. The resin sheet according to claim 1, wherein the inorganic filler has an average orientation angle of 30 degrees or less in a section of the resin sheet, the section in the direction perpendicular to the first surface, the section in which each orientation angle of the inorganic filler is calculated.

3. The resin sheet according to claim 1, wherein
    a section of the resin sheet, the section in a direction parallel to the first surface has a ratio of an area occupied by the inorganic filler, per unit area, the ratio represented by S1,
    a section of the resin sheet, the section in the direction perpendicular to the first surface has a ratio of an area occupied by the inorganic filler, per unit area, the ratio represented by S2, and
    a ratio of S1 to S2 is 2.0 or more.

4. The resin sheet according to claim 1, wherein the inorganic filler has an average particle diameter of 1.5 μm or less in a section of the resin sheet, the section in the direction perpendicular to the first surface, the section in which each particle diameter of the inorganic filler is calculated.

5. The resin sheet according to claim 1, wherein the inorganic filler has an average aspect ratio of 2.2 or more and 5 or less in a section of the resin sheet, the section in the direction perpendicular to the first surface, the section in which each aspect ratio of the inorganic filler is calculated.

6. The resin sheet according to claim 1, wherein an average maximum heat generation rate measured in accordance with ISO5660-1 under a condition of heater radiant heat of 50 kW/m$^2$ using an ignition is 140 kW/m$^2$ or less.

7. The resin sheet according to claim 1, wherein the inorganic filler is talc.

8. The resin sheet according to claim 1, wherein the inorganic filler is included at a content of 10 parts by weight or more and 40 parts by weight or less based on 100 parts by weight of the aromatic polycarbonate resin.

9. The resin sheet according to claim 1, wherein the phosphorus-containing compound is a phosphoric acid ester.

10. The resin sheet according to claim 1, wherein the phosphorus-containing compound is included at a content of 5 parts by weight or more and 25 parts by weight or less based on 100 parts by weight of the aromatic polycarbonate resin.

11. The resin sheet according to claim 1, wherein the silicon-containing compound is a core-shell particle including a core and a shell placed on a surface of the core.

12. The resin sheet according to claim 1, wherein the silicon-containing compound is included at a content of 2 parts by weight or more and 20 parts by weight or less based on 100 parts by weight of the aromatic polycarbonate resin.

13. The resin sheet according to claim 1, wherein a fluorine-based resin is included at a content of 0.5 parts by weight or more and 2 parts by weight or less based on 100 parts by weight of the aromatic polycarbonate resin.

14. The resin sheet according to claim 1, being an extruded sheet molded product.

15. The resin sheet according to claim 1, being an interior material for transport equipment.

16. The resin sheet according to claim 1, being an interior material for a railway vehicle.

* * * * *